United States Patent
Xiao et al.

(10) Patent No.: US 12,457,071 B2
(45) Date of Patent: Oct. 28, 2025

(54) WIRELESS TRANSMISSION METHOD AND APPARATUS, INFORMATION DETERMINATION METHOD AND APPARATUS, ELECTRONIC DEVICE, AND COMPUTER-READABLE STORAGE MEDIUM

(71) Applicant: ZTE CORPORATION, Shenzhen (CN)

(72) Inventors: Kai Xiao, Shenzhen (CN); Xing Liu, Shenzhen (CN); Peng Hao, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 387 days.

(21) Appl. No.: 17/800,711

(22) PCT Filed: Jan. 13, 2021

(86) PCT No.: PCT/CN2021/071472
§ 371 (c)(1),
(2) Date: Aug. 18, 2022

(87) PCT Pub. No.: WO2021/175016
PCT Pub. Date: Sep. 10, 2021

(65) Prior Publication Data
US 2023/0353310 A1    Nov. 2, 2023

(30) Foreign Application Priority Data
Mar. 5, 2020 (CN) .......................... 202010148328.3

(51) Int. Cl.
*H04L 5/00* (2006.01)
*H04J 11/00* (2006.01)
(Continued)

(52) U.S. Cl.
CPC ........ *H04L 5/0051* (2013.01); *H04J 11/0073* (2013.01); *H04W 56/0015* (2013.01); *H04W 72/0446* (2013.01)

(58) Field of Classification Search
CPC .............. H04L 5/0051; H04J 11/0073; H04W 56/0015; H04W 72/0446
See application file for complete search history.

(56) References Cited

U.S. PATENT DOCUMENTS

| | | |
|---|---|---|
| 2015/0016239 A1 | 1/2015 | Yi et al. |
| 2018/0220360 A1 | 8/2018 | Sheng et al. |

(Continued)

FOREIGN PATENT DOCUMENTS

| | | |
|---|---|---|
| CN | 109151985 A | 1/2019 |
| CN | 110291841 A | 9/2019 |

(Continued)

OTHER PUBLICATIONS

Office Action in Indian Application No. 202227056979, dated Feb. 28, 2023, 5 pages.

(Continued)

*Primary Examiner* — Kevin M Cunningham
(74) *Attorney, Agent, or Firm* — Morgan, Lewis & Bockius LLP

(57) ABSTRACT

Provided is a wireless transmission method. The wireless transmission method includes: transmitting a synchronization signal/physical broadcast channel block (SSB); where signals and a channel included in the SSB are mapped into M consecutive time domain symbols in a time-division multiplexing manner, M being a positive integer; and the SSB includes a physical broadcast channel (PBCH), a primary synchronization signal (PSS), and a secondary synchronization signal (SSS). Further provided are a wireless transmission apparatus, an information determination (Continued)

method and apparatus, an electronic device, and a computer-readable storage medium.

8 Claims, 9 Drawing Sheets

(51) Int. Cl.
*H04W 56/00* (2009.01)
*H04W 72/0446* (2023.01)

(56) References Cited

U.S. PATENT DOCUMENTS

| | | |
|---|---|---|
| 2018/0248642 A1 | 8/2018 | Si et al. |
| 2018/0287840 A1 | 10/2018 | Akkarakaran et al. |
| 2019/0028244 A1* | 1/2019 | Si .................... H04W 72/23 |
| 2019/0306832 A1 | 10/2019 | Si et al. |
| 2020/0015214 A1* | 1/2020 | Si ................ H04L 25/03866 |
| 2020/0099500 A1* | 3/2020 | Huang ............... H04W 72/30 |
| 2021/0160117 A1* | 5/2021 | Xiong ............... H04L 27/2602 |
| 2022/0150800 A1* | 5/2022 | Harada .............. H04L 5/0091 |

FOREIGN PATENT DOCUMENTS

| | | |
|---|---|---|
| CN | 110601809 A | 12/2019 |
| KR | 20190113846 A | 10/2019 |
| WO | WO-2017/171365 A2 | 10/2017 |
| WO | WO-2018/187093 A1 | 10/2018 |

OTHER PUBLICATIONS

Search Report in Chinese Application No. 2020101483283, dated Nov. 7, 2023, 4 pages including translation.
Office Action in Chinese Application No. 2020101483283, dated Nov. 7, 2023, 12 pages including translation.
Partial Supplementary European Search Report in Application No. 21763725.5, dated Mar. 11, 2024, 15 pages.
International Search Report in application No. PCT/CN2021/071472, dated Mar. 31, 2021, 6 pages, including translation.
Office Action in Korean Application No. 10-2022-7033436, dated Feb. 28, 2025, 7 pages, including translation.

\* cited by examiner

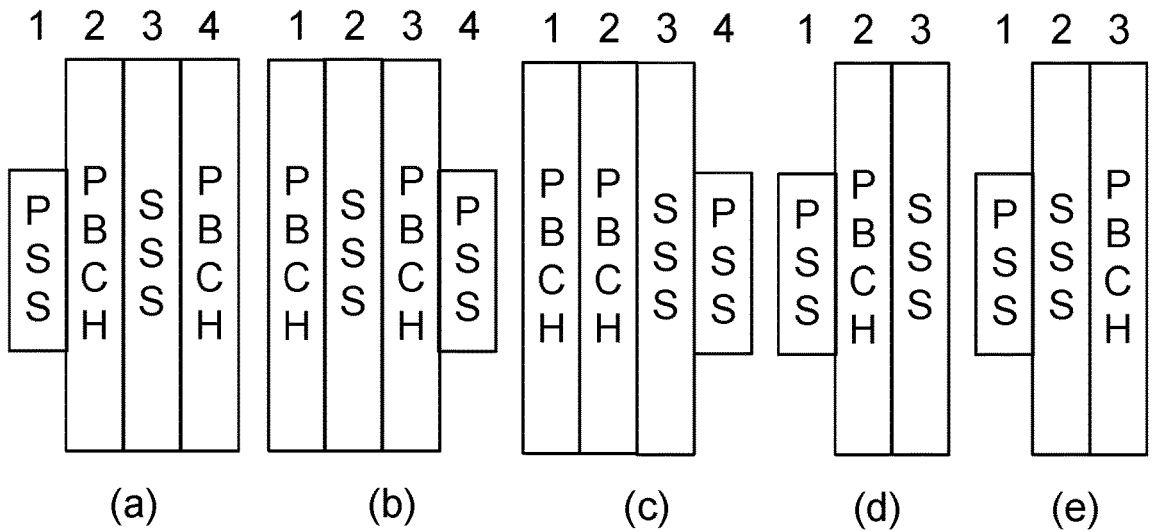
FIG. 5
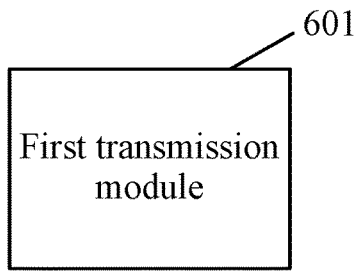
FIG. 6
700
Transmit a broadcast signal channel block; where signals and channels included in the broadcast signal channel block are mapped into 7N consecutive time domain symbols in a time-division multiplexing manner, N is an integer greater than or equal to 1, and the broadcast signal channel block includes a PDCCH, a DMRS, a PBCH, a PSS, an SSS, and a PDSCH
FIG. 7

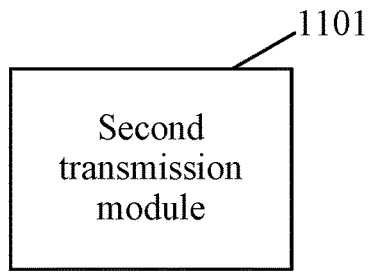

FIG. 11

Determine a frequency domain reference point of a DMRS according to a reference point and a first frequency offset; where the reference point includes any one of a lowest RB, a highest RB, a lowest RE, or a highest RE among frequency domain positions into which a position reference channel is mapped in a time domain symbol where the position reference channel is located

FIG. 12

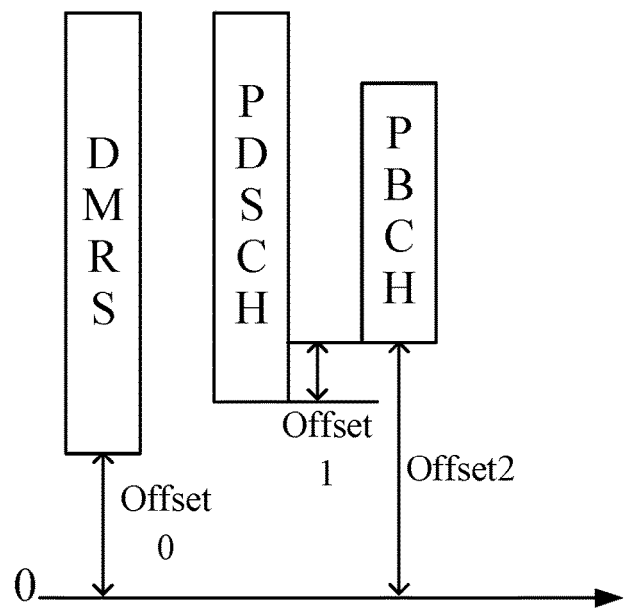

FIG. 13

WIRELESS TRANSMISSION METHOD AND APPARATUS, INFORMATION DETERMINATION METHOD AND APPARATUS, ELECTRONIC DEVICE, AND COMPUTER-READABLE STORAGE MEDIUM

CROSS REFERENCE TO RELATED APPLICATIONS

This is a National Stage Application filed under 35 U.S.C. 371 based on International Patent Application No. PCT/CN2021/071472, filed on Jan. 13, 2021, which claims priority to Chinese Patent Application No. 202010148328.3 filed on Mar. 5, 2020, the disclosures of both of which are incorporated herein by reference in their entireties.

TECHNICAL FIELD

The present disclosure relates to the field of communication, for example, a wireless transmission method and apparatus for transmitting a broadcast signal channel block (BSCHB) or a synchronization signal (SS)/physical broadcast channel (PBCH) block (SSB), an information determination method and apparatus, an electronic device, and a computer-readable storage medium.

BACKGROUND

An SSB is designed based on a multicarrier communication system and consists of a primary synchronization signal (PSS), a secondary synchronization signal (SSS), a physical broadcast channel (PBCH), and a demodulation reference signal (DMRS). The DMRS and the PBCH can be frequency-division multiplexed. The multicarrier system has the problems of a relatively large ratio of maximum instantaneous power to average power and sensitivity to a frequency offset and phase noise, which are more prominent in high frequency communication. A single-carrier communication system can reduce the above problems, and the hardware loss of the single-carrier system has a smaller effect than that of the multicarrier system. However, the PBCH and the DMRS are not allowed to be multiplexed on a frequency domain resource in the single-carrier system.

SUMMARY

The present disclosure provides a wireless transmission method and apparatus, an information determination method and apparatus, an electronic device, and a computer-readable storage medium.

An embodiment of the present disclosure provides a wireless transmission method. The method includes the step below.

An SSB is transmitted; where signals and a channel included in the SSB are mapped into M consecutive time domain symbols in a time-division multiplexing manner, and M is a positive integer; and the SSB includes a physical broadcast channel (PBCH), a primary synchronization signal (PSS), and a secondary synchronization signal (SSS).

In some embodiments, the SSB further includes a DMRS.

An embodiment of the present disclosure provides an electronic device. The electronic device includes at least one processor and a memory.

The memory is configured to store at least one program; where when executed by the at least one processor, the at least one program causes the at least one processor to perform any one of the preceding wireless transmission methods.

An embodiment of the present disclosure provides a computer-readable storage medium, which is configured to store a computer program which, when executed by a processor, implements any one of the preceding wireless transmission methods.

An embodiment of the present disclosure provides a wireless transmission method.

The method includes the step below.

A broadcast signal channel block is transmitted; where signals and channels included in the broadcast signal channel block are mapped into 7N consecutive time domain symbols in a time-division multiplexing manner, and N is an integer that is not less than 1; and the broadcast signal channel block includes a physical downlink control channel (PDCCH), a demodulation reference signal (DMRS), a physical broadcast channel (PBCH), a primary synchronization signal (PSS), and a secondary synchronization signal (SSS).

In some embodiments, the broadcast signal channel block further includes a physical downlink shared channel (PDSCH).

An embodiment of the present disclosure provides an electronic device. The electronic device includes at least one processor and a memory.

An embodiment of the present disclosure provides a computer-readable storage medium, which is configured to store a computer program which, when executed by a processor, implements any one of the preceding wireless transmission methods.

An embodiment of the present disclosure provides an information determination method. The method includes the step below.

A frequency domain reference point of a DMRS is determined according to a reference point and a first frequency offset; where the reference point includes any one of a lowest resource block (RB), a highest RB, a lowest resource element (RE), or a highest RE among frequency domain positions into which a position reference channel is mapped in a time domain symbol where the position reference channel is located.

An embodiment of the present disclosure provides an electronic device. The electronic device includes at least one processor and a memory.

The memory is configured to store at least one program; where when executed by the at least one processor, the at least one program causes the at least one processor to perform any one of the preceding information determination methods.

An embodiment of the present disclosure provides a computer-readable storage medium, which is configured to store a computer program which, when executed by a processor, implements any one of the preceding information determination methods.

An embodiment of the present disclosure provides an information determination method. The method includes the steps below.

An index of a first time domain symbol into which a candidate synchronization signal/physical broadcast channel block (SSB) is mapped under a subcarrier spacing of the SSB in a half radio frame is determined to be $n_0+n_1\times 14$; and the number of candidate SSBs in the half radio frame is determined to be $m=2\times l$; where $n_0$ is 2 or 9, $n_1 \in N$, $N \subset \{0, 1, 2, \ldots, k-1\}$, $$k = \frac{Tn_{scs}}{120t},$$

$n_{scs}$ is a size of the subcarrier spacing of the SSB which is measured in kHz, l={1, 2, . . . , k}, T is 5 ms, and t is 0.125 ms.

An embodiment of the present disclosure provides an electronic device. The electronic device includes at least one processor and a memory.

The memory is configured to store at least one program; where when executed by the at least one processor, the at least one program causes the at least one processor to perform any one of the preceding information determination methods.

An embodiment of the present disclosure provides a computer-readable storage medium, which is configured to store a computer program which, when executed by a processor, implements any one of the preceding information determination methods.

In the wireless transmission method provided by the embodiment of the present disclosure, the signals and the channel included in the SSB are mapped into the M consecutive time domain symbols in the time-division multiplexing manner to be transmitted, implementing the transmission of the SSB in a single-carrier system. In the wireless transmission method provided by the embodiment of the present disclosure, the PDCCH and the PDSCH are integrated based on the SSB so that the broadcast signal channel block (BSCHB) is formed, which is more conducive to sending an adaptive beam; and the signals and the channels included in the broadcast signal channel block are mapped into the 7N consecutive time domain symbols in the time-division multiplexing manner to be transmitted, implementing the transmission of the broadcast signal channel block in the single-carrier system. In the information determination method in the embodiment of the present disclosure, the frequency domain reference point is determined according to the position reference channel, so as to provide position reference for determining a DMRS demodulation sequence (that is, a reference sequence).

BRIEF DESCRIPTION OF DRAWINGS

FIG. 5 is a structural diagram of a mapping of an SSB into time domain symbols in example 4;

FIG. 6 is a block diagram of a wireless transmission apparatus according to an embodiment of the present disclosure;

FIG. 7 is a flowchart of another wireless transmission method according to an embodiment of the present disclosure;

FIG. 11 is a block diagram of another wireless transmission apparatus according to an embodiment of the present disclosure;

FIG. 12 is a flowchart of an information determination method according to an embodiment of the present disclosure;

FIG. 13 is a schematic diagram of an offset relationship between frequency domain positions of a frequency domain reference point, a to-be-demodulated channel (such as a PDCCH), and a position reference channel (such as a PBCH) in example 8;

DETAILED DESCRIPTION

Figure 1:
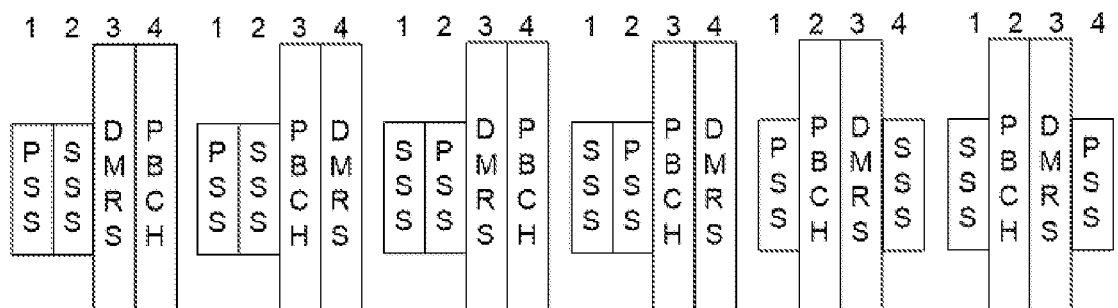
FIG. 1 is a flowchart of a wireless transmission method according to an embodiment of the present disclosure.

A wireless transmission method and apparatus, an information determination method and apparatus, an electronic device, and a computer-readable storage medium provided by the present disclosure are described below in conjunction with drawings.

Example embodiments are described hereinafter with reference to the drawings, but the described example embodiments may be embodied in different forms and are not to be construed as being limited to the embodiments set forth herein. These embodiments are provided for making the present disclosure thorough and complete.

As used herein, the term "and/or" includes any and all combinations of at least one of the associated listed items.

Terms used herein are only used for describing particular embodiments and not intended to limit the present disclosure. As used herein, a singular form "a"/"an" and "the" is intended to include a plural form, unless otherwise indicated in the context. The terms "include" and/or "made of" used herein specify the existence of the feature, entirety, step, operation, element, and/or component and do not exclude the presence or addition of at least one other feature, entirety, step, operation, element, and component and/or a group thereof.

Unless otherwise defined, all terms (including technical and scientific terms) used herein have the same meanings as those commonly understood by those having ordinary skill in the art. For example, those terms defined in commonly used dictionaries are to be interpreted as having meanings consistent with their meanings in the context of the related art and the present disclosure and are not to be interpreted in an idealized or overly formal sense unless expressly so defined herein.

The maturity of the 5th generation mobile communication technology (5G) will further support three application scenarios such as enhanced mobile broadband (eMBB), Ultra-Reliable Low-Latency Communications (URLLC), and massive machine-type communication (mMTC). In terms of system performance, a 5G system will have key capability indicators such as a peak rate of 10-20 Gbit/s, a density of 1 million connections per square kilometer, an air interface delay of 1 ms, support of a mobility of 500 km/h, and a traffic density of 10 Mbit/s per square meter. To enable a system capacity to meet the above prospect, the 5G adopts spectrum resources with higher frequencies and increases spectral efficiency 3-5 times relative to 4G.

5G unlicensed spectra are studied and a project to support standalone networking of an unlicensed cell is proposed in the industry. The International Telecommunication Union (ITU) has discussed three candidate frequency bands, 66-71 GHz, 71-76 GHz, and 81-86 GHz in a meeting. The United States has used 66-71 GHz as an unlicensed frequency band, and Europe has a tendency to adopt 66-71 GHz as the unlicensed frequency band. As for the design of unlicensed spectra of a high frequency band (above 52.6 GHz), some new problems faced by the transmission of an SS/PBCH block (SSB) need to be considered. In the related art, the SSB is designed based on a multicarrier communication system and consists of a PSS, an SSS, a PBCH, and a DMRS, where the DMRS and the PBCH can be frequency-division multiplexed. The multicarrier system has the problems of a relatively large ratio of maximum instantaneous power to average power and sensitivity to a frequency offset and phase noise, which are more prominent at a high frequency. A single-carrier communication system can reduce the above problems, and the hardware loss of the single-carrier system has a smaller effect than that of the multicarrier system. However, the PBCH and the DMRS are not allowed to be multiplexed on a frequency domain resource in the single-carrier system and there is no effective solution to how to transmit the SSB in the single-carrier system.

FIG. 1 is a flowchart of a wireless transmission method according to an embodiment of the present disclosure.

Referring to FIG. 1, the wireless transmission method provided in the embodiment of the present disclosure may be applied to a single-carrier communication node and includes the step below.

In step 100, an SSB is transmitted; where signals and a channel included in the SSB are mapped into M consecutive time domain symbols in a time-division multiplexing manner, M being a positive integer; and the SSB includes a PBCH, a PSS, and an SSS.

In some embodiments, transmission includes at least one of sending or receiving.

In some embodiments, M is any one of 3, 4, or 5.

In some embodiments, the SSB further includes a DMRS.

In some embodiments, the SSB has at least one of the characteristics described below.

Each signal included in the SSB is mapped into at least one resource block (RB) or at least one resource element (RE) of a time domain symbol where the each signal is located, and each channel included in the SSB is mapped into at least one RB or at least one RE of a time domain symbol where the each channel is located. An intersection between all RBs or REs of a time domain symbol where the PBCH is located and an RE into which the DMRS is mapped is empty. In some embodiments, an intersection between all RBs of a time domain symbol where any one signal or channel is located and an RE into which any other signal or channel is mapped is empty. A bandwidth occupied by the DMRS is greater than or equal to a bandwidth occupied by the PBCH carried in each time domain symbol into which the PBCH is mapped. A bandwidth occupied by the SSS is greater than or equal to a bandwidth occupied by the PBCH carried in each time domain symbol into which the PBCH is mapped. The SSS is cross-mapped into RBs or REs of a time domain symbol where the SSS is located, where being cross-mapped includes being mapped into only odd-numbered RBs or REs of the time domain symbol where the SSS is located or being mapped into only even-numbered RBs or REs of the time domain symbol where the SSS is located. The SSS is mapped into all RBs or REs of a time domain symbol where the SSS is located. The PSS, the SSS, and the DMRS are each mapped into one time domain symbol. The PSS and the SSS are each mapped into one time domain symbol. The PBCH is mapped into at least one time domain symbol. The PBCH is mapped into a previous time domain symbol and a next time domain symbol of a DMRS symbol. A PBCH symbol is adjacent to a DMRS symbol. At least one PBCH symbol is adjacent to an SSS symbol. The DMRS symbol is a time domain symbol into which the DMRS is mapped, the PBCH symbol is a time domain symbol into which the PBCH is mapped, and the SSS symbol is a time domain symbol into which the SSS is mapped.

In some embodiments, the RBs refer to RBs in frequency domain, that is, the RB includes 12 consecutive subcarriers in the frequency domain.

To demodulate the PBCH with reference to the DMRS, the bandwidth occupied by the DMRS needs to be greater than or equal to the bandwidth occupied by the PBCH carried in each time domain symbol. Similarly, to demodulate the PBCH with reference to the SSS, the bandwidth occupied by the SSS needs to be greater than or equal to the bandwidth occupied by the PBCH carried in each time domain symbol.

When the PBCH is demodulated with reference to the DMRS, the PBCH symbol being adjacent to the DMRS symbol improves accuracy. When the PBCH is demodulated with reference to the SSS, the PBCH symbol being adjacent to the SSS symbol improves the accuracy.

The characteristics of the SSB listed above may be combined randomly.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The bandwidth occupied by the DMRS is greater than or equal to the bandwidth occupied by the PBCH. The PSS, the SSS, the PBCH, and the DMRS are each mapped into one time domain symbol. The PBCH symbol is adjacent to the DMRS symbol, where the DMRS symbol is the time domain symbol into which the DMRS is mapped, and the PBCH symbol is the time domain symbol into which the PBCH is mapped.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The bandwidth occupied by the DMRS is greater than or equal to the bandwidth occupied by the PBCH carried in each time domain symbol into which the PBCH is mapped. The PSS, the SSS, and the DMRS are each mapped into one time domain symbol. The PBCH is mapped into two time domain symbols. The PBCH is mapped into the previous time domain symbol and the next time domain symbol of the DMRS symbol, where the DMRS symbol is the time domain symbol into which the DMRS is mapped.

Although two possible combinations of characteristics of the SSB are provided above, many other combinations are within the scope of the embodiments of the present disclosure. The details are not repeated here.

In some embodiments, M is 5 and the M consecutive time domain symbols are a first time domain symbol, a second time domain symbol, a third time domain symbol, a fourth time domain symbol, and a fifth time domain symbol in sequence; and the SSB includes the PSS, the SSS, the DMRS, and the PBCH. That the signals and the channels included in the SSB are mapped into the M consecutive time domain symbols in the time-division multiplexing manner includes any one of the following: the PSS is mapped into the first time domain symbol, the SSS is mapped into the second time domain symbol, the DMRS is mapped into the fourth time domain symbol, and the PBCH is mapped into the third time domain symbol and the fifth time domain symbol; the PSS is mapped into the second time domain symbol, the SSS is mapped into the first time domain symbol, the DMRS is mapped into the fourth time domain symbol, and the PBCH is mapped into the third time domain symbol and the fifth time domain symbol; the PSS is mapped into the fifth time domain symbol, the SSS is mapped into the first time domain symbol, the DMRS is mapped into the third time domain symbol, and the PBCH is mapped into the second time domain symbol and the fourth time domain symbol; the PSS is mapped into the first time domain symbol, the SSS is mapped into the fifth time domain symbol, the DMRS is mapped into the third time domain symbol, and the PBCH is mapped into the second time domain symbol and the fourth time domain symbol; the PSS is mapped into the fourth time domain symbol, the SSS is mapped into the fifth time domain symbol, the DMRS is mapped into the second time domain symbol, and the PBCH is mapped into the first time domain symbol and the third time domain symbol; or the PSS is mapped into the fifth time domain symbol, the SSS is mapped into the fourth time domain symbol, the DMRS is mapped into the second time domain symbol, and the PBCH is mapped into the first time domain symbol and the third time domain symbol.

In some embodiments, M is 4, the M consecutive time domain symbols are a sixth time domain symbol, a seventh time domain symbol, an eighth time domain symbol, and a ninth time domain symbol in sequence; and the SSB includes the PSS, the SSS, the DMRS, and the PBCH. That the signals and the channels included in the SSB are mapped into the M consecutive time domain symbols in the time-division multiplexing manner includes any one of the following: the PSS is mapped into the sixth time domain symbol, the SSS is mapped into the seventh time domain symbol, the DMRS is mapped into the eighth time domain symbol, and the PBCH is mapped into the ninth time domain symbol; the PSS is mapped into the sixth time domain symbol, the SSS is mapped into the seventh time domain symbol, the DMRS is mapped into the ninth time domain symbol, and the PBCH is mapped into the eighth time domain symbol; the PSS is mapped into the seventh time domain symbol, the SSS is mapped into the sixth time domain symbol, the DMRS is mapped into the eighth time domain symbol, and the PBCH is mapped into the ninth time domain symbol; the PSS is mapped into the seventh time domain symbol, the SSS is mapped into the sixth time domain symbol, the DMRS is mapped into the ninth time domain symbol, and the PBCH is mapped into the eighth time domain symbol; the PSS is mapped into the sixth time domain symbol, the SSS is mapped into the ninth time domain symbol, the DMRS is mapped into the eighth time domain symbol, and the PBCH is mapped into the seventh time domain symbol; the PSS is mapped into the ninth time domain symbol, the SSS is mapped into the sixth time domain symbol, the DMRS is mapped into the eighth time domain symbol, and the PBCH is mapped into the seventh time domain symbol. The PSS is mapped into the ninth time domain symbol, the SSS is mapped into the sixth time domain symbol, the DMRS is mapped into the seventh time domain symbol, and the PBCH is mapped into the eighth time domain symbol; the PSS is mapped into the sixth time domain symbol, the SSS is mapped into the ninth time domain symbol, the DMRS is mapped into the seventh time domain symbol, and the PBCH is mapped into the eighth time domain symbol; the PSS is mapped into the ninth time domain symbol, the SSS is mapped into the eighth time domain symbol, the DMRS is mapped into the sixth time domain symbol, and the PBCH is mapped into the seventh time domain symbol; the PSS is mapped into the eighth time domain symbol, the SSS is mapped into the ninth time domain symbol, the DMRS is mapped into the sixth time domain symbol, and the PBCH is mapped into the seventh time domain symbol; the PSS is mapped into the eighth time domain symbol, the SSS is mapped into the ninth time domain symbol, the DMRS is mapped into the seventh time domain symbol, and the PBCH is mapped into the sixth time domain symbol; or the PSS is mapped into the ninth time domain symbol, the SSS is mapped into the eighth time domain symbol, the DMRS is mapped into the seventh time domain symbol, and the PBCH is mapped into the sixth time domain symbol.

The mapping schemes provided above are only part of mapping schemes, and many other mapping schemes are within the scope of the embodiments of the present disclosure. The details are not repeated here.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The bandwidth occupied by the SSS is greater than or equal to the bandwidth occupied by the PBCH carried in each time domain symbol into which the PBCH is mapped. The SSS is cross-mapped into the RBs or REs of the time domain symbol where the SSS is located, where being cross-mapped includes being mapped into only the odd-numbered RBs or REs of the time domain symbol where the SSS is located or being mapped into only the even-numbered RBs or REs of the time domain symbol where the SSS is located. The PSS and the SSS are each mapped into one time domain symbol. The PBCH is mapped into at least one time domain symbol. At least one PBCH symbol is adjacent to the SSS symbol, where the PBCH symbol is the time domain symbol into which the PBCH is mapped, and the SSS symbol is the time domain symbol into which the SSS is mapped.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The bandwidth occupied by the SSS is greater than or equal to the bandwidth occupied by the PBCH carried in each time domain symbol into which the PBCH is mapped. The SSS is mapped into all the RBs or REs of the time domain symbol where the SSS is located. The intersection between all the RBs of the time domain symbol where the PBCH is located and the RE into which the DMRS is mapped is empty. The PSS and the SSS are each mapped into one time domain symbol. The PBCH is mapped into at least one time domain symbol. The SSS symbol is adjacent to at least one PBCH symbol, where the SSS symbol is the time domain symbol into which the SSS is mapped, and the PBCH symbol is the time domain symbol into which the PBCH is mapped.

Although two possible combinations of characteristics of the SSB are provided above, many other combinations are within the scope of the embodiments of the present disclosure. The details are not repeated here.

In some embodiments, M is 4, the M consecutive time domain symbols are a tenth time domain symbol, an eleventh time domain symbol, a twelfth time domain symbol, and a thirteenth time domain symbol in sequence; and the SSB includes the PSS, the SSS, and the PBCH. That the signals and the channels included in the SSB are mapped into the M consecutive time domain symbols in the time-division multiplexing manner includes any one of the following:

the PSS is mapped into the tenth time domain symbol, the SSS is mapped into the twelfth time domain symbol, and the PBCH is mapped into the eleventh time domain symbol and the thirteenth time domain symbol; the PSS is mapped into the thirteenth time domain symbol, the SSS is mapped into the eleventh time domain symbol, and the PBCH is mapped into the tenth time domain symbol and the twelfth time domain symbol; or the PSS is mapped into the thirteenth time domain symbol, the SSS is mapped into the twelfth time domain symbol, and the PBCH is mapped into the tenth time domain symbol and the eleventh time domain symbol.

In some embodiments, M is 3, the M consecutive time domain symbols are a fourteenth time domain symbol, a fifteenth time domain symbol, and a sixteenth time domain symbol in sequence; and the SSB includes the PSS, the SSS, and the PBCH. That the signals and the channels included in the SSB are mapped into the M consecutive time domain symbols in the time-division multiplexing manner includes any one of the following:

The PSS is mapped into the fourteenth time domain symbol, the SSS is mapped into the sixteenth time domain symbol, and the PBCH is mapped into the fifteenth time domain symbol; or the PSS is mapped into the fourteenth time domain symbol, the SSS is mapped into the fifteenth time domain symbol, and the PBCH is mapped into the sixteenth time domain symbol.

There are many other mapping schemes as long as the preceding characteristics of the SSB are satisfied. Mapping schemes that satisfy the preceding characteristics of the SSB are all within the scope of the embodiments of the present disclosure.

In the wireless transmission method provided by the embodiments of the present disclosure, the signals and the channel included in the SSB are mapped into the M consecutive time domain symbols in the time-division multiplexing manner to be transmitted, implementing the transmission of the SSB in a single-carrier system.

In the structure of the SSB, the PBCH needs to be demodulated by use of the DMRS. However, the PBCH and the DMRS are not allowed to be multiplexed on a frequency domain resource in the single-carrier system. A potential solution is to demodulate the PBCH by use of the PSS or SSS adjacent to the PBCH or separately introduce the DMRS symbol for demodulation. Therefore, the SSB transmitted in the single-carrier system may include the DMRS which serves as reference for the demodulation of the PBCH; or the SSB may not include the DMRS, and the PBCH is demodulated by use of the PSS or SSS adjacent to the PBCH.

The specific implementation process of the preceding embodiments is described below through several examples. The examples enumerated are only for convenience of description and cannot be considered as the only implementation schemes of the preceding embodiments.

Example 1

In this example, a method for transmitting an SSB is described, where signals and a channel included in the SSB are mapped into four consecutive time domain symbols in a time-division multiplexing manner; and the SSB includes a PSS, an SSS, a DMRS, and a PBCH.

In frequency domain, the main characteristics of the SSB include at least one of the characteristics described below: the PSS is mapped into at least one RB or at least one RE of a time domain symbol where the PSS is located; the SSS is mapped into at least one RB or at least one RE of a time domain symbol where the SSS is located; the DMRS is mapped into at least one RB or at least one RE of a time domain symbol where the DMRS is located; the PBCH is mapped into at least one RB or at least one RE of a time domain symbol where the PBCH is located; an intersection between all RBs or REs of the time domain symbol where the PBCH is located and an RE into which the DMRS is mapped is empty; or a bandwidth occupied by the DMRS is greater than or equal to a bandwidth occupied by the PBCH.

In time domain, the main characteristics of the SSB include at least one of the characteristics described below: the PSS, the SSS, the PBCH, and the DMRS are each mapped into one time domain symbol; or a PBCH symbol is adjacent to a DMRS symbol, where the PBCH symbol is a time domain symbol into which the PBCH is mapped, and the DMRS symbol is a symbol into which the DMRS is mapped.

Figure 2:
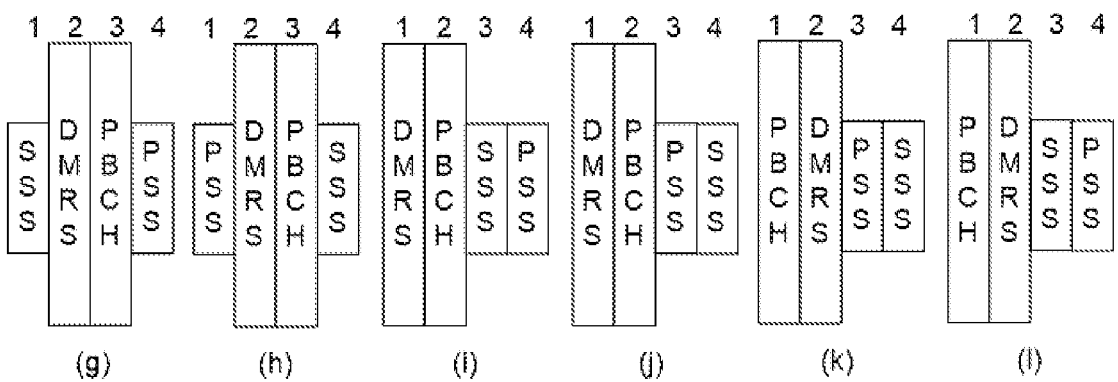
FIG. 2 is a structural diagram of a mapping of an SSB into time domain symbols in example 1.

As shown in FIG. 2, the four consecutive time domain symbols are numbered 1, 2, 3, and 4, separately, and the PSS, the SSS, the DMRS, and the PBCH may be mapped into the four consecutive time domain symbols in any one of the sequences described below: (a) PSS-SSS-DMRS-PBCH, that is, the numbers of the time domain symbols into which the PSS, the SSS, the DMRS, and the PBCH are mapped are {1}, {2}, {3}, and {4}, respectively; (b) PSS-SSS-PBCH-DMRS, that is, the numbers of the time domain symbols into which the PSS, the SSS, the DMRS, and the PBCH are mapped are {1}, {2}, {4}, and {3}, respectively; (c) SSS-PSS-DMRS-PBCH, that is, the numbers of the time domain symbols into which the PSS, the SSS, the DMRS, and the PBCH are mapped are {2}, {1}, {3}, and {4}, respectively; (d) SSS-PSS-PBCH-DMRS, that is, the numbers of the time domain symbols into which the PSS, the SSS, the DMRS, and the PBCH are mapped are {2}, {1}, {4}, and {3}, respectively; (e) PSS-PBCH-DMRS-SSS, that is, the numbers of the time domain symbols into which the PSS, the SSS, the DMRS, and the PBCH are mapped are {1}, {4}, {3}, and {2}, respectively; (f) SSS-PBCH-DMRS-PSS, that is, the numbers of the time domain symbols into which the PSS, the SSS, the DMRS, and the PBCH are mapped are {4}, {1}, {3}, and {2}, respectively; (g) SSS-DMRS-PBCH-PSS, that is, the numbers of the time domain symbols into which the PSS, the SSS, the DMRS, and the PBCH are mapped are {4}, {1}, {2}, and {3}, respectively; (h) PSS-DMRS-PBCH-SSS, that is, the numbers of the time domain symbols into which the PSS, the SSS, the DMRS, and the PBCH are mapped are {1}, {4}, {2}, and {3}, respectively; (i) DMRS-PBCH-SSS-PSS, that is, the numbers of the time domain symbols into which the PSS, the SSS, the DMRS, and the PBCH are mapped are {4}, {3}, {1}, and {2}, respectively; (j) DMRS-PBCH-PSS-SSS, that is, the numbers of the time domain symbols into which the PSS, the SSS, the DMRS, and the PBCH are mapped are {3}, {4}, {1}, and {2}, respectively; (k) PBCH-DMRS-PSS-SSS, that is, the numbers of the time domain symbols into which the PSS, the SSS, the DMRS, and the PBCH are mapped are {3}, {4}, {2}, and {1}, respectively; or (1) PBCH-DMRS-SSS-PSS, that is, the numbers of the time domain symbols into which the PSS, the SSS, the DMRS, and the PBCH are mapped are {4}, {3}, {2}, and {1}, respectively.

A height of each signal or channel in FIG. 2 represents a bandwidth occupied by the signal or channel. FIG. 2 shows only an example, which is neither to indicate that the bandwidth occupied by the signal or channel is limited to the bandwidth shown in FIG. 2 nor to indicate that a relationship between bandwidths occupied by the signals and the channel is limited to the relationship shown in FIG. 2.

A subcarrier spacing (SCS) of 120 kHz is shown as an example in FIG. 2, and the design can also support time domain structures with SCSs of 15 kHz, 30 kHz, 60 kHz, 240 kHz, 480 kHz, and 960 kHz.

Example 2

In this embodiment, a method for transmitting an SSB is described, where signals and a channel included in the SSB are mapped into five consecutive time domain symbols in a time-division multiplexing manner; and the SSB includes a PSS, an SSS, a DMRS, and a PBCH.

In frequency domain, the main characteristics of the SSB include at least one of the characteristics described below: the PSS is mapped into at least one RB or at least one RE of a time domain symbol where the PSS is located; the SSS is mapped into at least one RB or at least one RE of a time domain symbol where the SSS is located; the DMRS is mapped into at least one RB or at least one RE of a time domain symbol where the DMRS is located; the PBCH is mapped into at least one RB or at least one RE of a time domain symbol where the PBCH is located. An intersection between all RBs or REs of the time domain symbol where the PBCH is located and an RE into which the DMRS is mapped is empty; or a bandwidth occupied by the DMRS is greater than or equal to a bandwidth occupied by the PBCH carried in each time domain symbol into which the PBCH is mapped.

In time domain, the main characteristics of the SSB include at least one of the characteristics described below: the PSS, the SSS, and the DMRS are each mapped into one time domain symbol. The PBCH is mapped into two time domain symbols; or the PBCH is mapped into a previous time domain symbol and a next time domain symbol of a DMRS symbol, where the DMRS symbol is a time domain symbol into which the DMRS is mapped.

Figure 3:
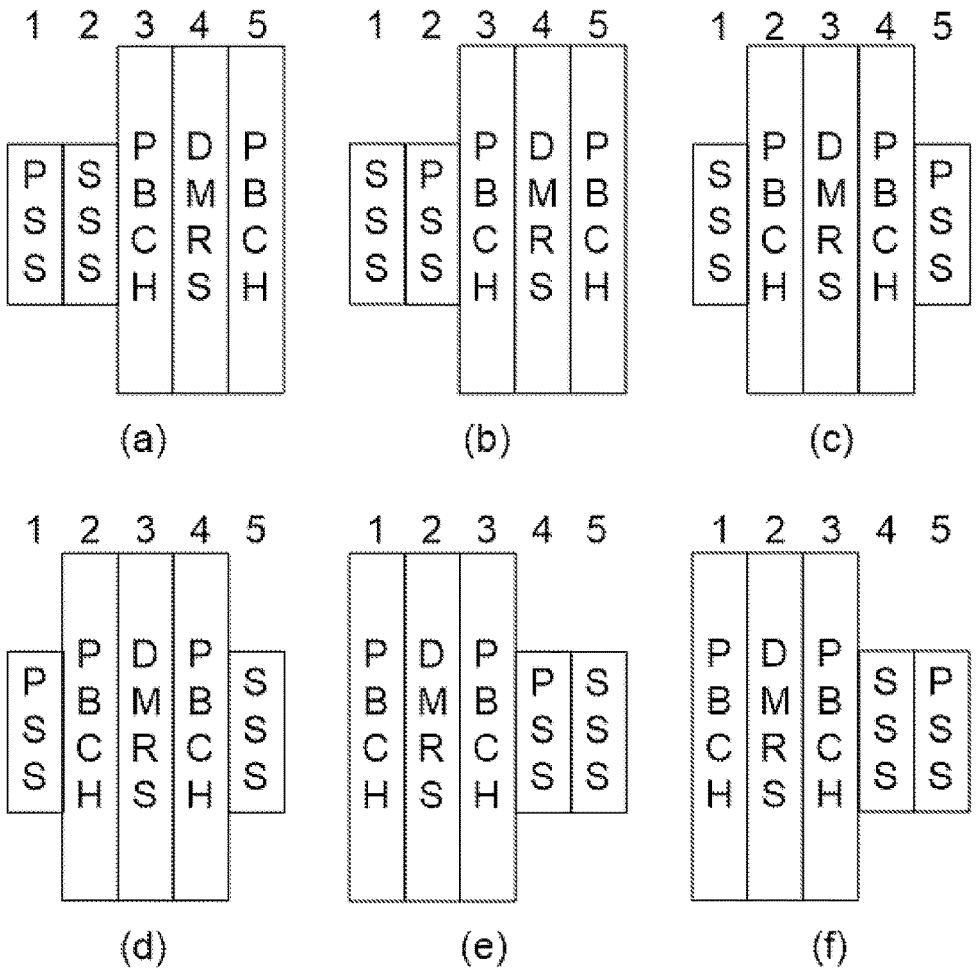
FIG. 3 is a structural diagram of a mapping of an SSB into time domain symbols in example 2.

As shown in FIG. 3, the five consecutive time domain symbols are numbered 1, 2, 3, 4, and 5, separately, and the PSS, the SSS, the DMRS, and the PBCH may be mapped into the five consecutive time domain symbols in any one of the sequences described below: (a) PSS-SSS-PBCH-DMRS-PBCH, that is, the numbers of the time domain symbols into which the PSS, the SSS, the DMRS, and the PBCH are mapped are {1}, {2}, {4}, and {3, 5}, respectively; (b) SSS-PSS-PBCH-DMRS-PBCH, that is, the numbers of the time domain symbols into which the PSS, the SSS, the DMRS, and the PBCH are mapped are {2}, {1}, {4}, and {3, 5}, respectively; (c) SSS-PBCH-DMRS-PBCH-PSS, that is, the numbers of the time domain symbols into which the PSS, the SSS, the DMRS, and the PBCH are mapped are {5}, {1}, {3}, and {2, 4}, respectively; (d) PSS-PBCH-DMRS-PBCH-SSS, that is, the numbers of the time domain symbols into which the PSS, the SSS, the DMRS, and the PBCH are mapped are {1}, {5}, {3}, and {2, 4}, respectively; (e) PBCH-DMRS-PBCH-PSS-SSS, that is, the numbers of the time domain symbols into which the PSS, the SSS, the DMRS, and the PBCH are mapped are {4}, {5}, {2}, and {1, 3}, respectively; or (f) PBCH-DMRS-PBCH-SSS-PSS, that is, the numbers of the time domain symbols into which the PSS, the SSS, the DMRS, and the PBCH are mapped are {5}, {4}, {2}, and {1, 3}, respectively.

A height of each signal or channel in FIG. 3 represents a bandwidth occupied by the signal or channel. FIG. 3 shows only an example, which is neither to indicate that the bandwidth occupied by the signal or channel is limited to the bandwidth shown in FIG. 3 nor to indicate that a relationship between bandwidths occupied by the signals and the channel is limited to the relationship shown in FIG. 3.

An SCS of 120 kHz is shown as an example in FIG. 3, and the design can also support time domain structures with SCSs of 15 kHz, 30 kHz, 60 kHz, 240 kHz, 480 kHz, and 960 kHz.

Example 3

In this embodiment, a method for transmitting an SSB is described, where signals and channels included in the SSB are mapped into three or four consecutive time domain symbols in a time-division multiplexing manner; and the SSB includes a PSS, an SSS, and a PBCH.

In frequency domain, the main characteristics of the SSB include at least one of the characteristics described below: the PSS is mapped into at least one RB of a time domain symbol where the PSS is located; the SSS is mapped into at least one RB of a time domain symbol where the SSS is located; the PBCH is mapped into at least one RB of a time domain symbol where the PBCH is located; a bandwidth occupied by the SSS is greater than or equal to a bandwidth occupied by the PBCH carried in each time domain symbol into which the PBCH is mapped; or the SSS is cross-mapped into RBs or REs of the time domain symbol where the SSS is located, where being cross-mapped may include being mapped into only odd-numbered RBs or REs of the time domain symbol where the SSS is located or being mapped into only even-numbered RBs or REs of the time domain symbol where the SSS is located.

In time domain, the main characteristics of the SSB include at least one of the characteristics described below: the PSS and the SSS are each mapped into one time domain symbol; the PBCH is mapped into one time domain symbol or two time domain symbols; or at least one PBCH symbol is adjacent to an SSS symbol, where the PBCH symbol is a time domain symbol into which the PBCH is mapped, and the SSS symbol is a time domain symbol into which the SSS is mapped.

Figure 4:
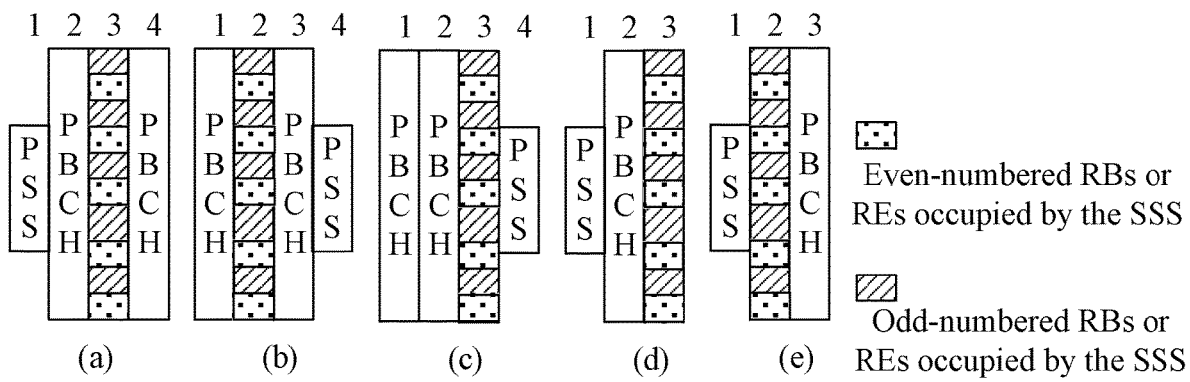
FIG. 4 is a structural diagram of a mapping of an SSB into time domain symbols in example 3.

As shown in FIG. 4, the three consecutive time domain symbols are numbered 1, 2, and 3, separately, the four consecutive time domain symbols are numbered 1, 2, 3, and 4, separately, and the PSS, the SSS, and the PBCH may be mapped into the three or four consecutive time domain symbols in any one of the sequences described below: (a) PSS-PBCH-SSS-PBCH, that is, the numbers of the time domain symbols into which the PSS, the SSS, and the PBCH are mapped are {1}, {3}, and {2, 4}, respectively, where the SSS is aligned with the PBCH in the frequency domain (that is to say, the bandwidth occupied by the SSS is equal to the bandwidth occupied by the PBCH, a frequency domain starting point of the SSS is the same as a frequency domain starting point of the PBCH, and a frequency domain ending point of the SSS is the same as a frequency domain ending point of the PBCH), and a sequence of the SSS is cross-mapped into RBs or Res; (b) PBCH-SSS-PBCH-PSS, that is, the numbers of the time domain symbols into which the PSS, the SSS, and the PBCH are mapped are {4}, {2}, and {1, 3}, respectively, where the SSS is aligned with the PBCH in the frequency domain, and the sequence of the SSS is cross-mapped into RBs or Res; (c) PBCH-PBCH-SSS-PSS, that is, the numbers of the time domain symbols into which the PSS, the SSS, and the PBCH are mapped are {4}, {3}, and {1, 2}, respectively, where the SSS is aligned with the PBCH in the frequency domain, and the sequence of the SSS is cross-mapped into RBs or Res; (d) PSS-PBCH-SSS, that is, the numbers of the time domain symbols into which the PSS, the SSS, and the PBCH are mapped are {1}, {3}, and {2}, respectively, where the SSS is aligned with the PBCH in the frequency domain, and the sequence of the SSS is cross-mapped into RBs or Res; or (e) PSS-SSS-PBCH, that is, the numbers of the time domain symbols into which the PSS, the SSS, and the PBCH are mapped are {1}, {2}, and {3}, respectively, where the SSS is aligned with the PBCH in the frequency domain, and the sequence of the SSS is cross-mapped into RBs or REs.

A height of each signal or channel in FIG. 4 represents a bandwidth occupied by the signal or channel. FIG. 4 shows only an example, which is neither to indicate that the bandwidth occupied by the signal or channel is limited to the bandwidth shown in FIG. 4 nor to indicate that a relationship between bandwidths occupied by the signals and the channel is limited to the relationship shown in FIG. 4.

An SCS of 120 kHz is shown as an example in FIG. 4, and the design can also support time domain structures with SCSs of 15 kHz, 30 kHz, 60 kHz, 240 kHz, 480 kHz, and 960 kHz.

Example 4

In this embodiment, a method for transmitting an SSB is described, where signals and a channel included in the SSB are mapped into three or four consecutive time domain symbols in a time-division multiplexing manner; and the SSB includes a PSS, an SSS, and a PBCH.

In frequency domain, the main characteristics of the SSB include at least one of the characteristics described below: the PSS is mapped into at least one RB or at least one RE of a time domain symbol where the PSS is located; the SSS is mapped into at least one RB of a time domain symbol where the SSS is located; the PBCH is mapped into at least one RB of a time domain symbol where the PBCH is located. A bandwidth occupied by the SSS is greater than or equal to a bandwidth occupied by the PBCH carried in each time domain symbol into which the PBCH is mapped; the SSS is mapped into all RBs or REs of the time domain symbol where the SSS is located; or an intersection between all RBs of the time domain symbol where the PBCH is located and an RE into which the DMRS is mapped is empty.

In time domain, the main characteristics of the SSB include at least one of the characteristics: the PSS and the SSS are each mapped into one time domain symbol; the PBCH is mapped into one time domain symbol or two time domain symbols; or an SSS symbol is adjacent to at least one PBCH symbol, where the SSS symbol is a time domain symbol into which the SSS is mapped, and the PBCH symbol is a time domain symbol into which the PBCH is mapped.

As shown in FIG. 5, the three consecutive time domain symbols are numbered 1, 2, and 3, separately, the four consecutive time domain symbols are numbered 1, 2, 3, and 4, separately, and the PSS, the SSS, and the PBCH may be mapped into the three or four consecutive time domain symbols in any one of the sequences: (a) PSS-PBCH-SSS-PBCH, that is, the numbers of the time domain symbols into which the PSS, the SSS, and the PBCH are mapped are {1}, {3}, and {2, 4}, respectively; (b) PBCH-SSS-PBCH-PSS, that is, the numbers of the time domain symbols into which the PSS, the SSS, and the PBCH are mapped are {4}, {2}, and {1, 3}, respectively; (c) PBCH-PBCH-SSS-PSS, that is, the numbers of the time domain symbols into which the PSS, the SSS, and the PBCH are mapped are {4}, {3}, and {1, 2}, respectively; (d) PSS-PBCH-SSS, that is, the numbers of the time domain symbols into which the PSS, the SSS, and the PBCH are mapped are {1}, {3}, and {2}, respectively; or (e) PSS-SSS-PBCH, that is, the numbers of the time domain symbols into which the PSS, the SSS, and the PBCH are mapped are {1}, {2}, and {3}, respectively.

A height of each signal or channel in FIG. 5 represents a bandwidth occupied by the signal or channel. FIG. 5 shows only an example, which is neither to indicate that the bandwidth occupied by the signal or channel is limited to the bandwidth shown in FIG. 5 nor to indicate that a relationship between bandwidths occupied by the signals and the channel is limited to the relationship shown in FIG. 5.

An SCS of 120 kHz is shown as an example in FIG. 5, and the design can also support time domain structures with SCSs of 15 kHz, 30 kHz, 60 kHz, 240 kHz, 480 kHz, and 960 kHz.

An embodiment of the present disclosure provides an electronic device. The electronic device includes at least one processor and a memory.

The memory is configured to store at least one program; where when executed by the at least one processor, the at least one program causes the at least one processor to perform any one of the preceding wireless transmission methods.

The processor is a device having a data processing capability and includes, but is not limited to, a central processing unit (CPU) and the like. The memory is a device having a data storage capability and includes, but is not limited to, a random-access memory (RAM) such as a synchronous dynamic RAM (SDRAM) and a double data rate (DDR) SDRAM, a read-only memory (ROM), an electrically erasable programmable ROM (EEPROM), and a flash memory.

In some embodiments, the processor and the memory are interconnected via a bus and then connected to other components of a computing device.

An embodiment of the present disclosure provides a computer-readable storage medium, which is configured to store a computer program which, when executed by a processor, implements any one of the preceding wireless transmission methods.

FIG. 6 is a block diagram of a wireless transmission apparatus according to an embodiment of the present disclosure.

Referring to FIG. 6, the wireless transmission apparatus provided in the embodiment of the present disclosure may be applied to a single-carrier communication node and includes a first transmission module 601.

The first transmission module 601 is configured to transmit an SSB; where signals and a channel included in the SSB are mapped into M consecutive time domain symbols in a time-division multiplexing manner, M being a positive integer; and the SSB includes a PBCH, a PSS, and an SSS.

In some embodiments, transmission includes at least one of sending or receiving.

In some embodiments, M is any one of 3, 4, or 5.

In some embodiments, the SSB further includes a DMRS.

In some embodiments, the SSB has at least one of the characteristics: each signal included in the SSB is mapped into at least one RB or at least one RE of a time domain symbol where the each signal is located, and each channel included in the SSB is mapped into at least one RB or at least one RE of a time domain symbol where the each channel is located; an intersection between all RBs or REs of a time domain symbol where the PBCH is located and an RE into which the DMRS is mapped is empty. In some embodiments, an intersection between all RBs or REs of a time domain symbol where any one signal or channel is located and an RE into which any other signal or channel is mapped is empty; a bandwidth occupied by the DMRS is greater than or equal to a bandwidth occupied by the PBCH carried in each time domain symbol into which the PBCH is mapped; a bandwidth occupied by the SSS is greater than or equal to a bandwidth occupied by the PBCH carried in each time domain symbol into which the PBCH is mapped; the SSS is cross-mapped into RBs or REs of a time domain symbol where the SSS is located, where being cross-mapped includes being mapped into only odd-numbered RBs or REs of the time domain symbol where the SSS is located or being mapped into only even-numbered RBs or REs of the time domain symbol where the SSS is located; the SSS is mapped into all RBs or REs of a time domain symbol where the SSS is located; the PSS, the SSS, and the DMRS are each mapped into one time domain symbol; the PSS and the SSS are each mapped into one time domain symbol; the PBCH is mapped into at least one time domain symbol; the PBCH is mapped into a previous time domain symbol and a next time domain symbol of a DMRS symbol; a PBCH symbol is adjacent to a DMRS symbol; at least one PBCH symbol is adjacent to an SSS symbol; or the DMRS symbol is a time domain symbol into which the DMRS is mapped, the PBCH symbol is a time domain symbol into which the PBCH is mapped, and the SSS symbol is a time domain symbol into which the SSS is mapped.

In some embodiments, the RBs refer to RBs in frequency domain, that is, the RB includes 12 consecutive subcarriers in the frequency domain.

To demodulate the PBCH with reference to the DMRS, the bandwidth occupied by the DMRS needs to be greater than or equal to the bandwidth occupied by the PBCH carried in each time domain symbol. Similarly, to demodulate the PBCH with reference to the SSS, the bandwidth occupied by the SSS needs to be greater than or equal to the bandwidth occupied by the PBCH carried in each time domain symbol.

When the PBCH is demodulated with reference to the DMRS, the PBCH symbol being adjacent to the DMRS symbol improves accuracy. When the PBCH is demodulated with reference to the SSS, the PBCH symbol being adjacent to the SSS symbol improves the accuracy.

The characteristics of the SSB listed above may be combined randomly.

In some embodiments, the SSB has the characteristics: each signal included in the SSB is mapped into at least one RB or at least one RE of the time domain symbol where the each signal is located; each channel included in the SSB is mapped into at least one RB or at least one RE of the time domain symbol where the each channel is located; the intersection between all the RBs or REs of the time domain symbol where the PBCH is located and the RE into which the DMRS is mapped is empty; the bandwidth occupied by the DMRS is greater than or equal to the bandwidth occupied by the PBCH; the PSS, the SSS, the PBCH, and the DMRS are each mapped into one time domain symbol; or the PBCH symbol is adjacent to the DMRS symbol, where the DMRS symbol is the time domain symbol into which the DMRS is mapped, and the PBCH symbol is the time domain symbol into which the PBCH is mapped.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The bandwidth occupied by the DMRS is greater than or equal to the bandwidth occupied by the PBCH carried in each time domain symbol into which the PBCH is mapped. The PSS, the SSS, and the DMRS are each mapped into one time domain symbol. The PBCH is mapped into two time domain symbols. The PBCH is mapped into the previous time domain symbol and the next time domain symbol of the DMRS symbol, where the DMRS symbol is the time domain symbol into which the DMRS is mapped.

Although two possible combinations of characteristics of the SSB are provided above, many other combinations are within the scope of the embodiments of the present disclosure. The details are not repeated here.

In some embodiments, M is 5 and the M consecutive time domain symbols are a first time domain symbol, a second time domain symbol, a third time domain symbol, a fourth time domain symbol, and a fifth time domain symbol in sequence; and the SSB includes the PSS, the SSS, the DMRS, and the PBCH. That the signals and the channel included in the SSB are mapped into the M consecutive time domain symbols in the time-division multiplexing manner includes any one of the following: the PSS is mapped into the first time domain symbol, the SSS is mapped into the second time domain symbol, the DMRS is mapped into the fourth time domain symbol, and the PBCH is mapped into the third time domain symbol and the fifth time domain symbol; the PSS is mapped into the second time domain symbol, the SSS is mapped into the first time domain symbol, the DMRS is mapped into the fourth time domain symbol, and the PBCH is mapped into the third time domain symbol and the fifth time domain symbol; the PSS is mapped into the fifth time domain symbol, the SSS is mapped into the first time domain symbol, the DMRS is mapped into the third time domain symbol, and the PBCH is mapped into the second time domain symbol and the fourth time domain symbol; the PSS is mapped into the first time domain symbol, the SSS is mapped into the fifth time domain symbol, the DMRS is mapped into the third time domain symbol, and the PBCH is mapped into the second time domain symbol and the fourth time domain symbol; the PSS is mapped into the fourth time domain symbol, the SSS is mapped into the fifth time domain symbol, the DMRS is mapped into the second time domain symbol, and the PBCH is mapped into the first time domain symbol and the third time domain symbol; or the PSS is mapped into the fifth time domain symbol, the SSS is mapped into the fourth time domain symbol, the DMRS is mapped into the second time domain symbol, and the PBCH is mapped into the first time domain symbol and the third time domain symbol.

In some embodiments, M is 4, the M consecutive time domain symbols are a sixth time domain symbol, a seventh time domain symbol, an eighth time domain symbol, and a ninth time domain symbol in sequence; and the SSB includes the PSS, the SSS, the DMRS, and the PBCH. That the signals and the channels included in the SSB are mapped into the M consecutive time domain symbols in the time-division multiplexing manner includes any one of the following: the PSS is mapped into the sixth time domain symbol, the SSS is mapped into the seventh time domain symbol, the DMRS is mapped into the eighth time domain symbol, and the PBCH is mapped into the ninth time domain symbol; the PSS is mapped into the sixth time domain symbol, the SSS is mapped into the seventh time domain symbol, the DMRS is mapped into the ninth time domain symbol, and the PBCH is mapped into the eighth time domain symbol; the PSS is mapped into the seventh time domain symbol, the SSS is mapped into the sixth time domain symbol, the DMRS is mapped into the eighth time domain symbol, and the PBCH is mapped into the ninth time domain symbol; the PSS is mapped into the seventh time domain symbol, the SSS is mapped into the sixth time domain symbol, the DMRS is mapped into the ninth time domain symbol, and the PBCH is mapped into the eighth time domain symbol; the PSS is mapped into the sixth time domain symbol, the SSS is mapped into the ninth time domain symbol, the DMRS is mapped into the eighth time domain symbol, and the PBCH is mapped into the seventh time domain symbol; the PSS is mapped into the ninth time domain symbol, the SSS is mapped into the sixth time domain symbol, the DMRS is mapped into the eighth time domain symbol, and the PBCH is mapped into the seventh time domain symbol; the PSS is mapped into the ninth time domain symbol, the SSS is mapped into the sixth time domain symbol, the DMRS is mapped into the seventh time domain symbol, and the PBCH is mapped into the eighth time domain symbol; The PSS is mapped into the sixth time domain symbol, the SSS is mapped into the ninth time domain symbol, the DMRS is mapped into the seventh time domain symbol, and the PBCH is mapped into the eighth time domain symbol; The PSS is mapped into the ninth time domain symbol, the SSS is mapped into the eighth time domain symbol, the DMRS is mapped into the sixth time domain symbol, and the PBCH is mapped into the seventh time domain symbol; the PSS is mapped into the eighth time domain symbol, the SSS is mapped into the ninth time domain symbol, the DMRS is mapped into the sixth time domain symbol, and the PBCH is mapped into the seventh time domain symbol; the PSS is mapped into the eighth time domain symbol, the SSS is mapped into the ninth time domain symbol, the DMRS is mapped into the seventh time domain symbol, and the PBCH is mapped into the sixth time domain symbol; or the PSS is mapped into the ninth time domain symbol, the SSS is mapped into the eighth time domain symbol, the DMRS is mapped into the seventh time domain symbol, and the PBCH is mapped into the sixth time domain symbol.

The mapping schemes provided above are only part of mapping schemes, and many other mapping schemes are within the scope of the embodiments of the present disclosure. The details are not repeated here.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The bandwidth occupied by the SSS is greater than or equal to the bandwidth occupied by the PBCH carried in each time domain symbol into which the PBCH is mapped. The SSS is cross-mapped into the RBs or REs of the time domain symbol where the SSS is located, where being cross-mapped includes being mapped into only the odd-numbered RBs or REs of the time domain symbol where the SSS is located or being mapped into only the even-numbered RBs or REs of the time domain symbol where the SSS is located. The PSS and the SSS are each mapped into one time domain symbol. The PBCH is mapped into at least one time domain symbol. At least one PBCH symbol is adjacent to the SSS symbol, where the PBCH symbol is the time domain symbol into which the PBCH is mapped, and the SSS symbol is the time domain symbol into which the SSS is mapped.

In some embodiments, the SSB has the characteristics described below.

Each signal included in the SSB is mapped into at least one RB or at least one RE of the time domain symbol where the each signal is located. Each channel included in the SSB is mapped into at least one RB or at least one RE of the time domain symbol where the each channel is located. The bandwidth occupied by the SSS is greater than or equal to the bandwidth occupied by the PBCH carried in each time domain symbol into which the PBCH is mapped. The SSS is mapped into all the RBs or REs of the time domain symbol where the SSS is located. The intersection between all the RBs or REs of the time domain symbol where the PBCH is located and the RE into which the DMRS is mapped is empty. The PSS and the SSS are each mapped into one time domain symbol. The PBCH is mapped into at least one time domain symbol. The SSS symbol is adjacent to at least one PBCH symbol, where the SSS symbol is the time domain symbol into which the SSS is mapped, and the PBCH symbol is the time domain symbol into which the PBCH is mapped.

Although two possible combinations of characteristics of the SSB are provided above, many other combinations are within the scope of the embodiments of the present disclosure. The details are not repeated here.

In some embodiments, M is 4 and the M consecutive time domain symbols are a tenth time domain symbol, an eleventh time domain symbol, a twelfth time domain symbol, and a thirteenth time domain symbol in sequence; and the SSB includes the PSS, the SSS, and the PBCH. That the signals and the channel included in the SSB are mapped into the M consecutive time domain symbols in the time-division multiplexing manner includes any one of the following: the PSS is mapped into the tenth time domain symbol, the SSS is mapped into the twelfth time domain symbol, and the PBCH is mapped into the eleventh time domain symbol and the thirteenth time domain symbol; the PSS is mapped into the thirteenth time domain symbol, the SSS is mapped into the eleventh time domain symbol, and the PBCH is mapped into the tenth time domain symbol and the twelfth time domain symbol; or the PSS is mapped into the thirteenth time domain symbol, the SSS is mapped into the twelfth time domain symbol, and the PBCH is mapped into the tenth time domain symbol and the eleventh time domain symbol.

In some embodiments, M is 3 and the M consecutive time domain symbols are a fourteenth time domain symbol, a fifteenth time domain symbol, and a sixteenth time domain symbol in sequence; and the SSB includes the PSS, the SSS, and the PBCH. That the signals and the channel included in the SSB are mapped into the M consecutive time domain symbols in the time-division multiplexing manner includes any one of the following: the PSS is mapped into the fourteenth time domain symbol, the SSS is mapped into the sixteenth time domain symbol, and the PBCH is mapped into the fifteenth time domain symbol; or the PSS is mapped into the fourteenth time domain symbol, the SSS is mapped into the fifteenth time domain symbol, and the PBCH is mapped into the sixteenth time domain symbol.

There are many other mapping schemes as long as the preceding characteristics of the SSB are satisfied. Mapping schemes that satisfy the preceding characteristics of the SSB are all within the scope of the embodiments of the present disclosure.

In the wireless transmission apparatus provided by the embodiments of the present disclosure, the signals and the channel included in the SSB are mapped into the M consecutive time domain symbols in the time-division multiplexing manner to be transmitted, implementing the transmission of the SSB in a single-carrier system.

In the structure of the SSB, the PBCH needs to be demodulated by use of the DMRS. However, the PBCH and the DMRS are not allowed to be multiplexed on a frequency domain resource in the single-carrier system. A potential solution is to demodulate the PBCH by use of the PSS or SSS adjacent to the PBCH or separately introduce the DMRS symbol for demodulation. Therefore, the SSB transmitted in the single-carrier system may include the DMRS which serves as reference for the demodulation of the PBCH; or the SSB may not include the DMRS, and the PBCH is demodulated by use of the PSS or SSS adjacent to the PBCH.

FIG. 7 is a flowchart of another wireless transmission method according to an embodiment of the present disclosure.

Referring to FIG. 7, another wireless transmission method provided in the embodiment of the present disclosure may be applied to a single-carrier communication node and includes the step below.

In step 700, a broadcast signal channel block is transmitted; where signals and channels included in the broadcast signal channel block are mapped into 7N consecutive time domain symbols in a time-division multiplexing manner, N being an integer greater than or equal to 1; and the broadcast signal channel block includes at least one of a physical downlink control channel (PDCCH), a DMRS, a PBCH, a PSS, an SSS, or a physical downlink shared channel (PDSCH).

In some embodiments, the transmission includes at least one of sending or receiving.

In some embodiments, the broadcast signal channel block has at least one of the characteristics: each signal included in the broadcast signal channel block is mapped into at least one RB or at least one RE of a time domain symbol where the each signal is located, and each channel included in the SSB is mapped into at least one RB or at least one RE of a time domain symbol where the each channel is located; an intersection between all RBs or REs of a time domain symbol where the PBCH is located and an RE into which the DMRS is mapped is empty; an intersection between all RBs or REs of a time domain symbol where the PDCCH is located and an RE into which the DMRS is mapped is empty; a bandwidth occupied by the DMRS carried in each of at least one time domain symbol is greater than or equal to a bandwidth occupied by the PBCH carried in each time domain symbol into which the PBCH is mapped; a bandwidth occupied by the DMRS carried in each of at least one time domain symbol is greater than or equal to a bandwidth occupied by the PDCCH carried in each time domain symbol into which the PDCCH is mapped; the PSS and the SSS are each mapped into one time domain symbol; the DMRS is mapped into at least one time domain symbol; the PBCH is mapped into at least one time domain symbol; the PDCCH is mapped into at least one time domain symbol; the PBCH is mapped into a previous time domain symbol and a next time domain symbol of a DMRS symbol or the PBCH is mapped into next two time domain symbols of the DMRS symbol; the PDCCH is mapped into a time domain symbol adjacent to a DMRS symbol; the PBCH is mapped into a time domain symbol adjacent to a DMRS symbol or the PBCH is mapped into a time domain symbol spaced from the DMRS symbol by one time domain symbol; the PDSCH is mapped into a remaining time-frequency resource, where the remaining time-frequency resource includes a time-frequency resource of time-frequency resources corresponding to the broadcast signal channel block except time-frequency resources occupied by other signals and channels except the PDSCH; or the PDSCH is mapped into at least one time domain symbol. The DMRS symbol is a time domain symbol into which the DMRS is mapped.

In some embodiments, the RBs refer to RBs in frequency domain, that is, the RB includes 12 consecutive subcarriers in the frequency domain.

In some embodiments, none of RBs of a time domain symbol where any one signal or channel is located contains an RE into which any other signal or channel is mapped.

To demodulate the PBCH with reference to the DMRS, the bandwidth occupied by the DMRS carried in each of at least one time domain symbol needs to be greater than or equal to the bandwidth occupied by the PBCH carried in each time domain symbol. Similarly, to demodulate the PDCCH with reference to the DMRS, the bandwidth occupied by the DMRS carried in each of at least one time domain symbol needs to be greater than or equal to the bandwidth occupied by the PDCCH carried in each time domain symbol.

When the PBCH is demodulated with reference to the DMRS, a PBCH symbol being adjacent to the DMRS symbol improves accuracy. When the PBCH is demodulated with reference to the SSS, the PBCH symbol being adjacent to an SSS symbol improves the accuracy.

The characteristics of the SSB listed above may be combined randomly.

In some embodiments, the broadcast signal channel block has the characteristics described below.

Each signal included in the broadcast signal channel block is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The intersection between all the RBs or REs of the time domain symbol where the PDCCH is located and the RE into which the DMRS is mapped is empty. The bandwidth occupied by the DMRS is greater than or equal to the bandwidth occupied by the PBCH carried in each time domain symbol into which the PBCH is mapped. The bandwidth occupied by the DMRS is greater than or equal to the bandwidth occupied by the PDCCH carried in each time domain symbol into which the PDCCH is mapped. The DMRS, the PSS, and the SSS are each mapped into one time domain symbol. The PBCH is mapped into two time domain symbols. The PDCCH is mapped into at least one time domain symbol. The PBCH is mapped into the previous time domain symbol and the next time domain symbol of the DMRS symbol; or the PBCH is mapped into the next two time domain symbols of the DMRS symbol. The PDCCH is mapped into the time domain symbol adjacent to the DMRS symbol. The PDSCH is mapped into at least one complete time domain symbol, or the PDSCH is mapped into the remaining time-frequency resource, where the remaining time-frequency resource includes the time-frequency resource of the time-frequency resources corresponding to the broadcast signal channel block except the time-frequency resources occupied by the other signals and channels except the PDSCH. The DMRS symbol is the time domain symbol into which the DMRS is mapped.

In some embodiments, the broadcast signal channel block has the characteristics described below.

Each signal included in the broadcast signal channel block is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The intersection between all the RBs or REs of the time domain symbol where the PDCCH is located and the RE into which the DMRS is mapped is empty. The bandwidth occupied by the DMRS carried in each of at least one time domain symbol into which the DMRS is mapped is greater than or equal to the bandwidth occupied by the PDCCH. The bandwidth occupied by the DMRS carried in each of at least one time domain symbol into which the DMRS is mapped is greater than or equal to the bandwidth occupied by the PBCH carried in each time domain symbol into which the PBCH is mapped. The PSS and the SSS are each mapped into one time domain symbol. The PBCH is mapped into two time domain symbols and mapped into the previous time domain symbol and the next time domain symbol of the DMRS symbol. The PDCCH is mapped into one time domain symbol and mapped into the time domain symbol adjacent to the DMRS symbol. The PDSCH is mapped into the remaining time-frequency resource, where the remaining time-frequency resource includes the time-frequency resource of the time-frequency resources corresponding to the broadcast signal channel block except the time-frequency resources occupied by the other signals and channels except the PDSCH. The DMRS is mapped into two time domain symbols. The DMRS symbol is the symbol into which the DMRS is mapped.

In some embodiments, the broadcast signal channel block has the characteristics described below.

Each signal included in the broadcast signal channel block is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The intersection between all the RBs or REs of the time domain symbol where the PDCCH is located and the RE into which the DMRS is mapped is empty. The bandwidth occupied by the DMRS carried in each of at least one time domain symbol into which the DMRS is mapped is greater than or equal to the bandwidth occupied by the PDCCH carried in each time domain symbol into which the PDCCH is mapped. The bandwidth occupied by the DMRS carried in each of at least one time domain symbol into which the DMRS is mapped is greater than or equal to the bandwidth occupied by the PBCH. The PSS, the SSS, and the PBCH are each mapped into one time domain symbol. The PDSCH, the DMRS, and the PDCCH are each mapped into at least one time domain symbol. The PDCCH is mapped into the time domain symbol adjacent to the DMRS symbol. The PBCH is mapped into the time domain symbol adjacent to the DMRS symbol or mapped into the time domain symbol spaced from the DMRS symbol by one time domain symbol. The DMRS symbol is the time domain symbol into which the DMRS is mapped.

Although three possible combinations of characteristics of the broadcast signal channel block are provided above, many other combinations are within the scope of the embodiments of the present disclosure. The details are not repeated here.

In some embodiments, N is 1 and the 7N consecutive time domain symbols are a seventeenth time domain symbol, an eighteenth time domain symbol, a nineteenth time domain symbol, a twentieth time domain symbol, a twenty-first time domain symbol, a twenty-second time domain symbol, and a twenty-third time domain symbol in sequence, and that the signals and the channels included in the broadcast signal channel block are mapped into the 7N consecutive time domain symbols in the time-division multiplexing manner includes any one of the following: the PDCCH is mapped into the seventeenth time domain symbol, the DMRS is mapped into the eighteenth time domain symbol, the PBCH is mapped into the nineteenth time domain symbol and the twentieth time domain symbol, the PSS is mapped into the twenty-first time domain symbol, the SSS is mapped into the twenty-second time domain symbol, and the PDSCH is mapped into the twenty-third time domain symbol; the PDCCH is mapped into the seventeenth time domain symbol, the DMRS is mapped into the eighteenth time domain symbol, the PBCH is mapped into the nineteenth time domain symbol and the twentieth time domain symbol, the PSS is mapped into the twenty-second time domain symbol, the SSS is mapped into the twenty-first time domain symbol, and the PDSCH is mapped into the twenty-third time domain symbol; the PDCCH is mapped into the seventeenth time domain symbol, the DMRS is mapped into the nineteenth time domain symbol, the PBCH is mapped into the eighteenth time domain symbol and the twentieth time domain symbol, the PSS is mapped into the twenty-first time domain symbol, the SSS is mapped into the twenty-second time domain symbol, and the PDSCH is mapped into the twenty-third time domain symbol; the PDCCH is mapped into the seventeenth time domain symbol, the DMRS is mapped into the nineteenth time domain symbol, the PBCH is mapped into the eighteenth time domain symbol and the twentieth time domain symbol, the PSS is mapped into the twenty-second time domain symbol, the SSS is mapped into the twenty-first time domain symbol, and the PDSCH is mapped into the twenty-third time domain symbol; the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-first time domain symbol, the SSS is mapped into the twenty-second time domain symbol, and the PDSCH is mapped into the twenty-third time domain symbol; the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-second time domain symbol, the SSS is mapped into the twenty-first time domain symbol, and the PDSCH is mapped into the twenty-third time domain symbol; the PDCCH is mapped into the seventeenth time domain symbol, the DMRS is mapped into the eighteenth time domain symbol and the twenty-second time domain symbol, the PBCH is mapped into the twenty-first time domain symbol and the twenty-third time domain symbol, the PSS is mapped into the nineteenth time domain symbol, and the SSS is mapped into the twentieth time domain symbol; the PDCCH is mapped into the seventeenth time domain symbol, the DMRS is mapped into the eighteenth time domain symbol and the twenty-second time domain symbol, the PBCH is mapped into the twenty-first time domain symbol and the twenty-third time domain symbol, the PSS is mapped into the twentieth time domain symbol, and the SSS is mapped into the nineteenth time domain symbol; the DCCH is mapped into the seventeenth time domain symbol, the DMRS is mapped into the eighteenth time domain symbol and the twenty-first time domain symbol, the PBCH is mapped into the twentieth time domain symbol and the twenty-second time domain symbol, the PSS is mapped into the twenty-third time domain symbol, and the SSS is mapped into the nineteenth time domain symbol; the PDCCH is mapped into the seventeenth time domain symbol, the DMRS is mapped into the eighteenth time domain symbol and the twenty-first time domain symbol, the PBCH is mapped into the twentieth time domain symbol and the twenty-second time domain symbol, the PSS is mapped into the nineteenth time domain symbol, and the SSS is mapped into the twenty-third time domain symbol; the PDCCH is mapped into the seventeenth time domain symbol, the DMRS is mapped into the eighteenth time domain symbol and the twentieth time domain symbol, the PBCH is mapped into the nineteenth time domain symbol and the twenty-first time domain symbol, the PSS is mapped into the twenty-second time domain symbol, and the SSS is mapped into the twenty-third time domain symbol; the PDCCH is mapped into the seventeenth time domain symbol, the DMRS is mapped into the eighteenth time domain symbol and the twentieth time domain symbol, the PBCH is mapped into the nineteenth time domain symbol and the twenty-first time domain symbol, the PSS is mapped into the twenty-third time domain symbol, and the SSS is mapped into the twenty-second time domain symbol; the PDCCH is mapped into the seventeenth time domain symbol, the DMRS is mapped into the eighteenth time domain symbol, the PBCH is mapped into the nineteenth time domain symbol, the PSS is mapped into the twentieth time domain symbol, the SSS is mapped into the twenty-first time domain symbol, and the PDSCH is mapped into the twenty-second time domain symbol and the twenty-third time domain symbol; the PDCCH is mapped into the seventeenth time domain symbol, the DMRS is mapped into the eighteenth time domain symbol and the twenty-first time domain symbol, the PBCH is mapped into the twenty-second time domain symbol, the PSS is mapped into the nineteenth time domain symbol, the SSS is mapped into the twentieth time domain symbol, and the PDSCH is mapped into the twenty-third time domain symbol; the PDCCH is mapped into the seventeenth time domain symbol, the DMRS is mapped into the eighteenth time domain symbol and the twenty-first time domain symbol, the PBCH is mapped into the twentieth time domain symbol, the PSS is mapped into the nineteenth time domain symbol, the SSS is mapped into the twenty-second time domain symbol, and the PDSCH is mapped into the twenty-third time domain symbol; the PDCCH is mapped into the seventeenth time domain symbol, the DMRS is mapped into the eighteenth time domain symbol and the twentieth time domain symbol, the PBCH is mapped into the twenty-first time domain symbol, the PSS is mapped into the nineteenth time domain symbol, the SSS is mapped into the twenty-second time domain symbol, and the PDSCH is mapped into the twenty-third time domain symbol; the PDCCH is mapped into the eighteenth time domain symbol, the DMRS is mapped into the seventeenth time domain symbol and the twenty-first time domain symbol, the PBCH is mapped into the twentieth time domain symbol, the PSS is mapped into the nineteenth time domain symbol, the SSS is mapped into the twenty-second time domain symbol, and the PDSCH is mapped into the twenty-third time domain symbol; the PDCCH is mapped into the eighteenth time domain symbol, the DMRS is mapped into the seventeenth time domain symbol and the twentieth time domain symbol, the PBCH is mapped into the twenty-first time domain symbol, the PSS is mapped into the nineteenth time domain symbol, the SSS is mapped into the twenty-second time domain symbol, and the PDSCH is mapped into the twenty-third time domain symbol; the PDCCH is mapped into the seventeenth time domain symbol, the DMRS is mapped into the eighteenth time domain symbol and the twenty-second time domain symbol, the PBCH is mapped into the twenty-first time domain symbol, the PSS is mapped into the nineteenth time domain symbol, the SSS is mapped into the twentieth time domain symbol, and the PDSCH is mapped into the twenty-third time domain symbol; the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-first time domain symbol, the SSS is mapped into the twenty-second time domain symbol, and the PDSCH is mapped into the twenty-third time domain symbol; or the PDCCH is mapped into the eighteenth time domain symbol, the DMRS is mapped into the seventeenth time domain symbol, the PBCH is mapped into the nineteenth time domain symbol, the PSS is mapped into the twentieth time domain symbol, the SSS is mapped into the twenty-first time domain symbol, and the PDSCH is mapped into the twenty-second time domain symbol and the twenty-third time domain symbol.

There are many other mapping schemes as long as the preceding characteristics of the SSB are satisfied. Mapping schemes that satisfy the preceding characteristics of the SSB are all within the scope of the embodiments of the present disclosure.

In the wireless transmission method in the embodiments of the present disclosure, the PDCCH and the PDSCH are integrated based on the SSB so that the broadcast signal channel block (BSCHB) is formed, which is more conducive to sending an adaptive beam; and the signals and the channels included in the broadcast signal channel block are mapped into the 7N consecutive time domain symbols in the time-division multiplexing manner to be transmitted, implementing the transmission of the broadcast signal channel block in a single-carrier system.

The specific implementation process of the preceding embodiments is described below through several examples. The examples enumerated are only for convenience of description and cannot be considered as the only implementation schemes of the preceding embodiments.

Example 5

In this embodiment, a method for transmitting a BSCHB is described, where signals and channels included in the BSCHB are mapped into seven consecutive time domain symbols in a time-division multiplexing manner; and the BSCHB includes signals or channels such as a PDCCH, a DMRS, a PBCH, a PSS, an SSS, and a PDSCH.

In frequency domain, the main characteristics of the BSCHB include at least one of the characteristics: the PDCCH is mapped into at least one RB or at least one RE of a time domain symbol where the PDCCH is located; the DMRS is mapped into at least one RB or at least one RE of a time domain symbol where the DMRS is located; the PBCH is mapped into at least one RB or at least one RE of a time domain symbol where the PBCH is located; the PSS is mapped into at least one RB or at least one RE of a time domain symbol where the PSS is located; the SSS is mapped into at least one RB or at least one RE of a time domain symbol where the SSS is located; the PDSCH is mapped into at least one RB or at least one RE of a time domain symbol where the PDSCH is located; an intersection between all RBs or REs of the time domain symbol where the PBCH is located and an RE into which the DMRS is mapped is empty; an intersection between all RBs or REs of the time domain symbol where the PDCCH is located and the RE into which the DMRS is mapped is empty; a bandwidth occupied by the DMRS is greater than or equal to a bandwidth occupied by the PDCCH carried in each time domain symbol into which the PDCCH is mapped; or the bandwidth occupied by the DMRS is greater than or equal to a bandwidth occupied by the PBCH carried in each time domain symbol into which the PBCH is mapped.

In time domain, the main characteristics of the BSCHB include at least one of the characteristics: the DMRS, the PSS, and the SSS are each mapped into one time domain symbol; the PBCH is mapped into two time domain symbols, and the PBCH is mapped into next two time domain symbols of a DMRS symbol or mapped into a previous time domain symbol and a next time domain symbol of the DMRS symbol; the PDCCH is mapped into at least one time domain symbol and mapped into a time domain symbol adjacent to the DMRS symbol; the PDSCH is mapped into at least one complete time domain symbol or mapped into the same time domain symbol as another channel; or the DMRS symbol is a time domain symbol into which the DMRS is mapped.

Figure 8:
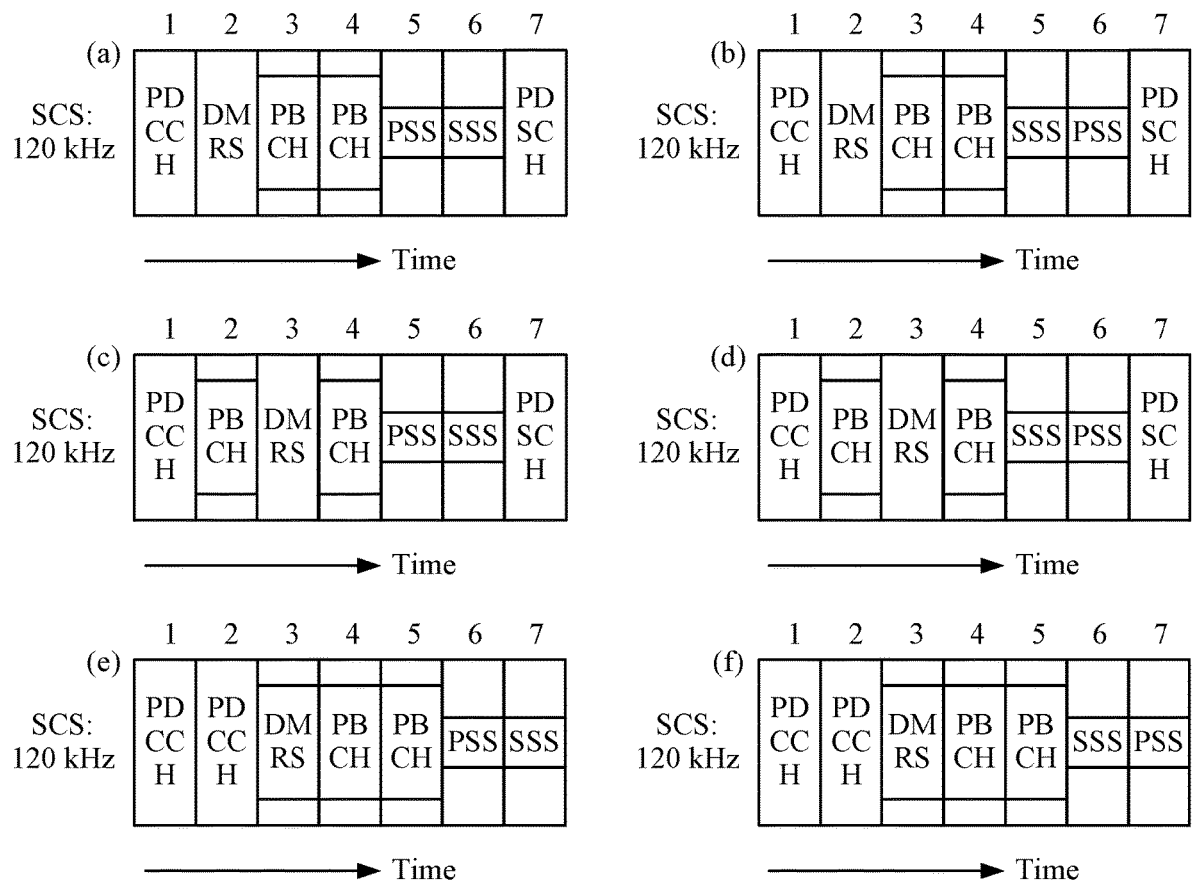
FIG. 8 is a structural diagram of a mapping of a broadcast signal channel block into time domain symbols in example 5.

As shown in FIG. 8, the seven consecutive time domain symbols are numbered 1, 2, 3, 4, 5, 6, and 7, separately, and the PDCCH, the DMRS, the PBCH, the PSS, the SSS, and the PDSCH may be mapped into the seven consecutive time domain symbols in any one of the sequences: (a) PDCCH-DMRS-PBCH-PBCH-PSS-SSS-PDSCH, that is, the numbers of the time domain symbols into which the PDCCH, the DMRS, the PBCH, the PSS, the SSS, and the PDSCH are mapped are {1}, {2}, {3, 4}, {5}, {6}, and {7}, respectively; (b) PDCCH-DMRS-PBCH-PBCH-SSS-PSS-PDSCH, that is, the numbers of the time domain symbols into which the PDCCH, the DMRS, the PBCH, the PSS, the SSS, and the PDSCH are mapped are {1}, {2}, {3, 4}, {6}, {5}, and {7}, respectively; (c) PDCCH-PBCH-DMRS-PBCH-PSS-SSS-PDSCH, that is, the numbers of the time domain symbols into which the PDCCH, the DMRS, the PBCH, the PSS, the SSS, and the PDSCH are mapped are {1}, {3}, {2, 4}, {5}, {6}, and {7}, respectively; (d) PDCCH-PBCH-DMRS-PBCH-SSS-PSS-PDSCH, that is, the numbers of the time domain symbols into which the PDCCH, the DMRS, the PBCH, the PSS, the SSS and the PDSCJ are mapped are {1}, {3}, {2, 4}, {6}, {5}, and {7}, respectively; (e) PDCCH-PDCCH-DMRS-PBCH-PBCH-PSS-SSS, that is, the numbers of the time domain symbols into which the PDCCH, the DMRS, the PBCH, the PSS, and the SSS are mapped are {1, 2}, {3}, {4, 5}, {6}, and {7}, respectively; or (f) PDCCH-PDCCH-DMRS-PBCH-PBCH-SSS-PSS, that is, the numbers of the time domain symbols into which the PDCCH, the DMRS, the PBCH, the PSS, and the SSS are mapped are {1, 2}, {3}, {4, 5}, {7}, and {6}, respectively.

When the bandwidth occupied by each of the PDCCH, the DMRS, the PBCH, the PSS, and the SSS is smaller than a configured bandwidth of the BSCHB, the time domain symbol into which the PDSCH is mapped may optionally be {1, 2, 3, 4, 5, 6, 7}. The configured bandwidth of the BSCHB may be a bandwidth part (BWP) where the BSCHB is located or a bandwidth of the BSCHB configured by a base station.

An SCS of 120 kHz is shown as an example in FIG. 8, and the design can also support time domain structures with SCSs of 15 kHz, 30 kHz, 60 kHz, 240 kHz, 480 kHz, and 960 kHz.

Example 6

In this embodiment, a method for transmitting a BSCHB is described, where signals and channels included in the BSCHB are mapped into seven consecutive time domain symbols in a time-division multiplexing manner; and the BSCHB includes signals or channels such as a PDCCH, a DMRS, a PBCH, a PSS, an SSS, and a PDSCH.

In frequency domain, the main characteristics of the BSCHB include at least one of the characteristics: the PDCCH is mapped into at least one RB or at least one RE of a time domain symbol where the PDCCH is located; the DMRS is mapped into at least one RB or at least one RE of a time domain symbol where the DMRS is located; the PBCH is mapped into at least one RB or at least one RE of a time domain symbol where the PBCH is located; the PSS is mapped into at least one RB or at least one RE of a time domain symbol where the PSS is located; the SSS is mapped into at least one RB or at least one RE of a time domain symbol where the SSS is located; the PDSCH is mapped into at least one RB or at least one RE of a time domain symbol where the PDSCH is located; an intersection between all RBs or REs of the time domain symbol where the PBCH is located and an RE into which the DMRS is mapped is empty; an intersection between all RBs or REs of the time domain symbol where the PDCCH is located and the RE into which the DMRS is mapped is empty; a bandwidth occupied by the DMRS carried in each of at least one time domain symbol into which the DMRS is mapped is greater than or equal to a bandwidth occupied by the PDCCH; or the bandwidth occupied by the DMRS carried in each of at least one time domain symbol into which the DMRS is mapped is greater than or equal to a bandwidth occupied by the PBCH carried in each time domain symbol into which the PBCH is mapped.

In time domain, the main characteristics of the BSCHB include at least one of the characteristics: the PSS and the SSS are each mapped into one time domain symbol; the PBCH is mapped into two time domain symbols and mapped into a previous time domain symbol and a next time domain symbol of a DMRS symbol; the PDCCH is mapped into one time domain symbol and mapped into a time domain symbol adjacent to the DMRS symbol; the PDSCH is not mapped or is mapped into the same time domain symbol as another channel; or the DMRS is mapped into two time domain symbols. The DMRS symbol is a symbol into which the DMRS is mapped.

Figure 9:
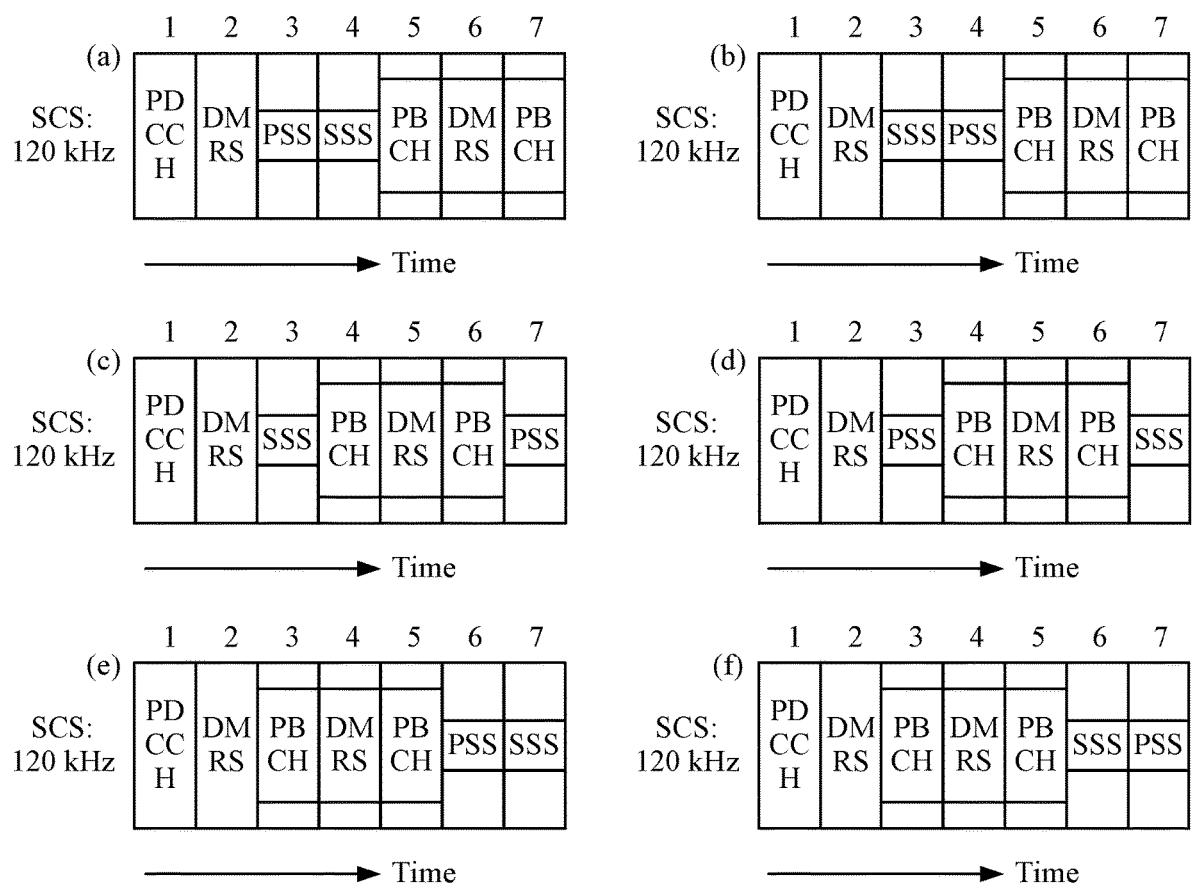
FIG. 9 is a structural diagram of a mapping of a broadcast signal channel block into time domain symbols in example 6.

As shown in FIG. 9, the seven consecutive time domain symbols are numbered 1, 2, 3, 4, 5, 6, and 7, separately, and the PDCCH, the DMRS, the PBCH, the PSS, the SSS, and the PDSCH may be mapped into the seven consecutive time domain symbols in any one of the sequences: (a) PDCCH-DMRS-PSS-SSS-PBCH-DMRS-PBCH, that is, the numbers of the time domain symbols into which the PDCCH, the DMRS, the PBCH, the PSS, and the SSS are mapped are {1}, {2, 6}, {5, 7}, {3}, and {4}, respectively; (b) PDCCH-DMRS-SSS-PSS-PBCH-DMRS-PBCH, that is, the numbers of the time domain symbols into which the PDCCH, the DMRS, the PBCH, the PSS, and the SSS are mapped are {1}, {2, 6}, {5, 7}, {4}, and {3}, respectively; (c) PDCCH-DMRS-SSS-PBCH-DMRS-PBCH-PSS, that is, the numbers of the time domain symbols into which the PDCCH, the DMRS, the PBCH, the PSS, and the SSS are mapped are {1}, {2, 5}, {4, 6}, {7}, and {3}, respectively; (d) PDCCH-DMRS-SSS-PBCH-DMRS-PBCH-PSS, that is, the numbers of the time domain symbols into which the PDCCH, the DMRS, the PBCH, the PSS, and the SSS are mapped are {1}, {2, 5}, {4, 6}, {3}, and {7}, respectively; (e) PDCCH-DMRS-PBCH-DM RS-PBCH-PSS-SSS, that is, the numbers of the time domain symbols into which the PDCCH, the DMRS, the PBCH, the PSS, and the SSS are mapped are {1}, {2, 4}, {3, 5}, {6}, and {7}, respectively; or (f) PDCCH-DMRS-PBCH-DMRS-PBCH-SSS-PSS, that is, the numbers of the time domain symbols into which the PDCCH, the DMRS, the PBCH, the PSS, and the SSS are mapped are {1}, {2, 4}, {3, 5}, {7}, and {6}, respectively.

When the bandwidth occupied by each of the PDCCH, the DMRS, the PBCH, the PSS, and the SSS is smaller than a configured bandwidth of the BSCHB, the time domain symbol into which the PDSCH is mapped may optionally be {1, 2, 3, 4, 5, 6, 7}. The configured bandwidth of the BSCHB may be a BWP where the BSCHB is located or a bandwidth of the BSCHB configured by a base station.

An SCS of 120 kHz is shown as an example in FIG. 9, and the design can also support time domain structures with SCSs of 15 kHz, 30 kHz, 60 kHz, 240 kHz, 480 kHz, and 960 kHz.

Example 7

In this embodiment, a method for transmitting a BSCHB is described, where signals and channels included in the BSCHB are mapped into seven consecutive time domain symbols in a time-division multiplexing manner; and the BSCHB includes signals or channels such as a PDCCH, a DMRS, a PBCH, a PSS, an SSS, and a PDSCH.

In frequency domain, the main characteristics of the BSCHB include at least one of the characteristics: the PDCCH is mapped into at least one RB or at least one RE of a time domain symbol where the PDCCH is located; the DMRS is mapped into at least one RB or at least one RE of a time domain symbol where the DMRS is located; the PBCH is mapped into at least one RB or at least one RE of a time domain symbol where the PBCH is located; the PSS is mapped into at least one RB or at least one RE of a time domain symbol where the PSS is located; the SSS is mapped into at least one RB or at least one RE of a time domain symbol where the SSS is located; the PDSCH is mapped into at least one RB or at least one RE of a time domain symbol where the PDSCH is located; an intersection between all RBs or REs of the time domain symbol where the PBCH is located and an RE into which the DMRS is mapped is empty; an intersection between all RBs or REs of the time domain symbol where the PDCCH is located and the RE into which the DMRS is mapped is empty; a bandwidth occupied by the DMRS carried in each of at least one time domain symbol into which the DMRS is mapped is greater than or equal to a bandwidth occupied by the PDCCH carried in each time domain symbol into which the PDCCH is mapped; or the bandwidth occupied by the DMRS carried in each of at least one time domain symbol into which the DMRS is mapped is greater than or equal to a bandwidth occupied by the PBCH.

In time domain, the main characteristics of the BSCHB include at least one of the characteristics: the PSS, the SSS, and the PBCH are each mapped into one time domain symbol. The PDSCH, the DMRS, and the PDCCH are each mapped into at least one time domain symbol; the PDCCH is mapped into a time domain symbol adjacent to a DMRS symbol; or the PBCH is mapped into a time domain symbol adjacent to the DMRS symbol or mapped into a time domain symbol spaced from the DMRS symbol by one time domain symbol. The DMRS symbol is a time domain symbol into which the DMRS is mapped.

Figure 10:
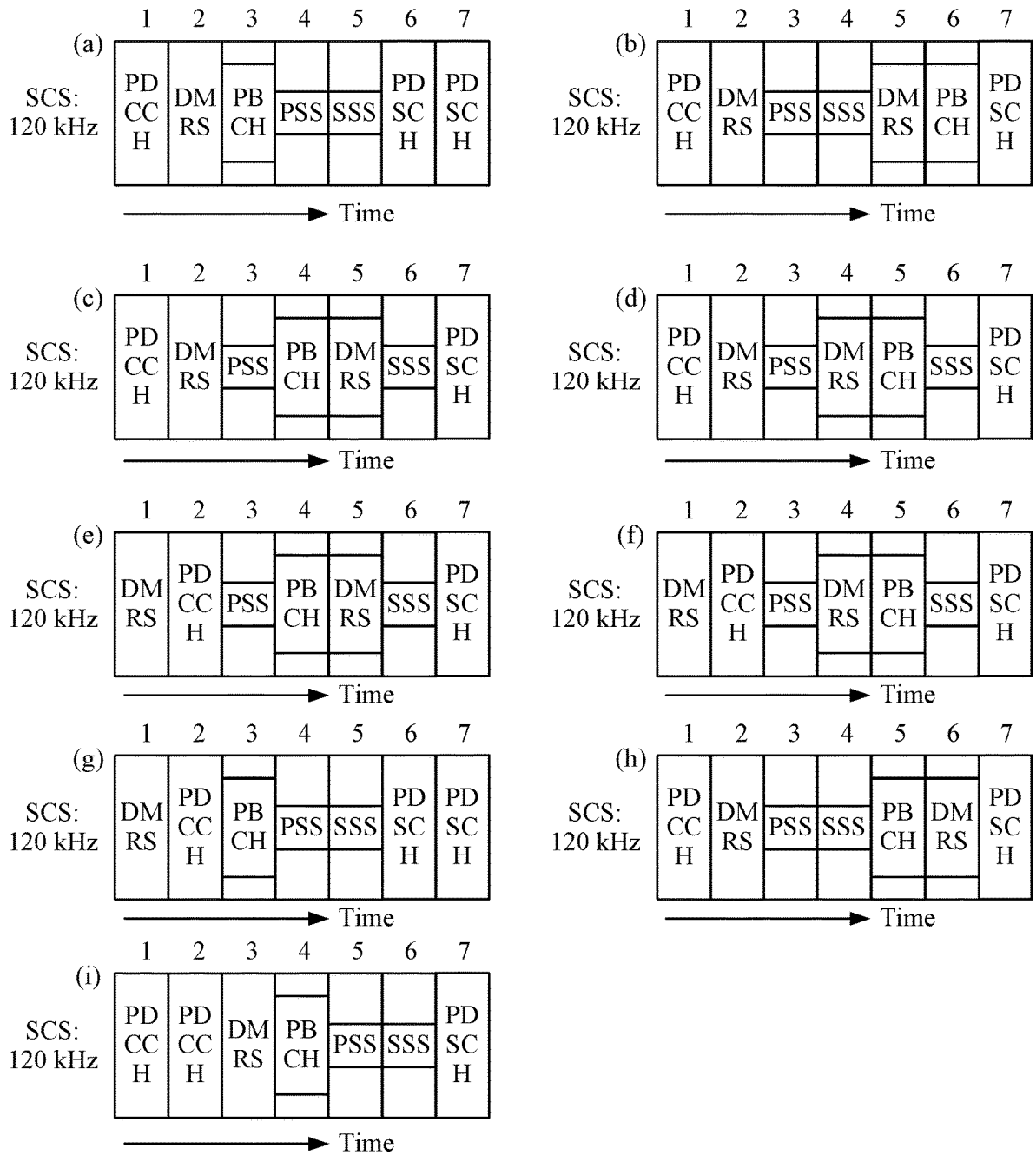
FIG. 10 is a structural diagram of a mapping of a broadcast signal channel block into time domain symbols in example 7.

As shown in FIG. 10, the seven consecutive time domain symbols are numbered 1, 2, 3, 4, 5, 6, and 7, separately, and the PDCCH, the DMRS, the PBCH, the PSS, the SSS, and the PDSCH may be mapped into the seven consecutive time domain symbols in any one of the sequence: (a) PDCCH-DMRS-PBCH-PSS-SSS-PDSCH-PDSCH, that is, the numbers of the time domain symbols into which the PDCCH, the DMRS, the PBCH, the PSS, the SSS, and the PDSCH are mapped are {1}, {2}, {3}, {4}, {5}, and {6, 7}, respectively; (b) PDCCH-DMRS-PSS-SSS-DMRS-PBCH-PDSCH, that is, the numbers of the time domain symbols into which the PDCCH, the DMRS, the PBCH, the PSS, the SSS, and the PDSCH are mapped are {1}, {2, 5}, {6}, {3}, {4}, and {7}, respectively; (c) PDCCH-DMRS-PSS-PBCH-DMRS-SSS-PDSCH, that is, the numbers of the time domain symbols into which the PDCCH, the DMRS, the PBCH, the PSS, the SSS, and the PDSCH are mapped are {1}, {2, 5}, {4}, {3}, {6}, and {7}, respectively; (d) PDCCH-DMRS-PSS-DMRS-PBCH-SSS-PDSCH, that is, the numbers of the time domain symbols into which the PDCCH, the DMRS, the PBCH, the PSS, the SSS, and the PDSCH are mapped are {1}, {2, 4}, {5}, {3}, {6}, and {7}, respectively; (e) DMRS-PDCCH-PSS-PBCH-DMRS-SSS-PDSCH, that is, the numbers of the time domain symbols into which the PDCCH, the DMRS, the PBCH, the PSS, the SSS, and the PDSCH are mapped are {2}, {1, 5}, {4}, {3}, {6}, and {7}, respectively; (f) DMRS-PDCCH-PSS-DMRS-PBCH-SSS-PDSCH, that is, the numbers of the time domain symbols into which the PDCCH, the DMRS, the PBCH, the PSS, the SSS, and the PDSCH are mapped are {2}, {1, 4}, {5}, {3}, {6}, and {7}, respectively; (g) DMRS-PDCCH-PBCH-PSS-SSS-PDSCH-PDSCH, that is, the numbers of the time domain symbols into which the PDCCH, the DMRS, the PBCH, the PSS, the SSS, and the PDSCH are mapped are {2}, {1}, {3}, {4}, {5}, and {6, 7}, respectively; (h) PDCCH-DMRS-PSS-SSS-PBCH-DMRS-PDSCH, that is, the numbers of the time domain symbols into which the PDCCH, the DMRS, the PBCH, the PSS, the SSS, and the PDSCH are mapped are {1}, {2, 6}, {5}, {3}, {4}, and {7}, respectively; or (i) PDCCH-PDCCH-DMRS-PBCH-PSS-SSS-PDSCH, that is, the numbers of the time domain symbols into which the PDCCH, the DMRS, the PBCH, the PSS, the SSS, and the PDSCH are mapped are {1, 2}, {3}, {4}, {5}, {6}, and {7}, respectively.

When the bandwidth occupied by each of the PDCCH, the DMRS, the PBCH, the PSS, and the SSS is smaller than a configured bandwidth of the BSCHB, the time domain symbol into which the PDSCH is mapped may optionally be {1, 2, 3, 4, 5, 6, 7}. The configured bandwidth of the BSCHB may be a BWP where the BSCHB is located or a bandwidth of the BSCHB configured by a base station.

An SCS of 120 kHz is shown as an example in FIG. 10, and the design can also support structures with SCSs of 15 kHz, 30 kHz, 60 kHz, 240 kHz, 480 kHz, and 960 kHz.

An embodiment of the present disclosure provides an electronic device. The electronic device includes at least one processor and a storage apparatus.

The storage apparatus is configured to store at least one program; where when executed by the at least one processor, the at least one program causes the at least one processor to perform any one of the preceding wireless transmission methods.

The processor is a device having a data processing capability and includes, but is not limited to, a central processing unit (CPU) and the like. A memory is a device having a data storage capability and includes, but is not limited to, a RAM such as an SDRAM and a DDR SDRAM, a ROM, an EEPROM, and a flash memory.

In some embodiments, the processor and the memory are interconnected via a bus and then connected to other components of a computing device.

An embodiment of the present disclosure provides a computer-readable storage medium, which is configured to store a computer program which, when executed by a processor, implements any one of the preceding wireless transmission methods.

FIG. 11 is a block diagram of another wireless transmission apparatus according to an embodiment of the present disclosure.

Referring to FIG. 11, another wireless transmission apparatus provided in the embodiment of the present disclosure may be applied to a single-carrier communication node and includes a second transmission module 1101.

The second transmission module 1101 is configured to transmit a broadcast signal channel block; where signals and channels included in the broadcast signal channel block are mapped into 7N consecutive time domain symbols in a time-division multiplexing manner, N being an integer greater than or equal to 1; and the broadcast signal channel block includes at least one of a physical downlink control channel (PDCCH), a DMRS, a PBCH, a PSS, an SSS, or a physical downlink shared channel (PDSCH).

In some embodiments, being transmitted includes at least one of being sent or being received.

In some embodiments, the broadcast signal channel block has at least one of the characteristics: each signal included in the broadcast signal channel block is mapped into at least one RB or at least one RE of a time domain symbol where the each signal is located, and each channel included in the SSB is mapped into at least one RB or at least one RE of a time domain symbol where the each channel is located; an intersection between all RBs or REs of a time domain symbol where the PBCH is located and a RE into which the DMRS is mapped is empty; an intersection between all RBs or REs of a time domain symbol where the PDCCH is located and a RE into which the DMRS is mapped is empty; a bandwidth occupied by the DMRS carried in each of at least one time domain symbol is greater than or equal to a bandwidth occupied by the PBCH carried in each time domain symbol into which the PBCH is mapped; a bandwidth occupied by the DMRS carried in each of at least one time domain symbol is greater than or equal to a bandwidth occupied by the PDCCH carried in each time domain symbol into which the PDCCH is mapped; the PSS and the SSS are each mapped into one time domain symbol; the DMRS is mapped into at least one time domain symbol; the PBCH is mapped into at least one time domain symbol; the PDCCH is mapped into at least one time domain symbol; the PBCH is mapped into a previous time domain symbol and a next time domain symbol of a DMRS symbol; or the PBCH is mapped into next two time domain symbols of the DMRS symbol; the PDCCH is mapped into a time domain symbol adjacent to a DMRS symbol; the PBCH is mapped into a time domain symbol adjacent to a DMRS symbol or the PBCH is mapped into a time domain symbol spaced from the DMRS symbol by one time domain symbol; The PDSCH is mapped into a remaining time-frequency resource, where the remaining time-frequency resource includes a time-frequency resource of time-frequency resources corresponding to the broadcast signal channel block except time-frequency resources occupied by other signals and channels except the PDSCH; or the PDSCH is mapped into at least one time domain symbol. The DMRS symbol is a time domain symbol into which the DMRS is mapped.

In some embodiments, the RBs refer to RBs in frequency domain, that is, the RB includes 12 consecutive subcarriers in the frequency domain.

In some embodiments, none of RBs of a time domain symbol where any one signal or channel is located contains an RE into which any other signal or channel is mapped.

To demodulate the PBCH with reference to the DMRS, the bandwidth occupied by the DMRS carried in each of at least one time domain symbol needs to be greater than or equal to the bandwidth occupied by the PBCH carried in each time domain symbol. Similarly, to demodulate the PDCCH with reference to the DMRS, the bandwidth occupied by the DMRS carried in each of at least one time domain symbol needs to be greater than or equal to the bandwidth occupied by the PDCCH carried in each time domain symbol.

When the PBCH is demodulated with reference to the DMRS, a PBCH symbol being adjacent to the DMRS symbol improves accuracy. When the PBCH is demodulated with reference to the SSS, the PBCH symbol being adjacent to an SSS symbol improves the accuracy.

The characteristics of the SSB listed above may be combined randomly.

In some embodiments, the broadcast signal channel block has the characteristics: each signal included in the broadcast signal channel block is mapped into at least one RB or at least one RE of the time domain symbol where the each signal is located; each channel included in the SSB is mapped into at least one RB or at least one RE of the time domain symbol where the each channel is located; the intersection between all the RBs or REs of the time domain symbol where the PBCH is located and the RE into which the DMRS is mapped is empty; the intersection between all the RBs or REs of the time domain symbol where the PDCCH is located and the RE into which the DMRS is mapped is empty; the bandwidth occupied by the DMRS is greater than or equal to the bandwidth occupied by the PBCH carried in each time domain symbol into which the PBCH is mapped; the bandwidth occupied by the DMRS is greater than or equal to the bandwidth occupied by the PDCCH carried in each time domain symbol into which the PDCCH is mapped. The DMRS, the PSS, and the SSS are each mapped into one time domain symbol; the PBCH is mapped into two time domain symbols; the PDCCH is mapped into at least one time domain symbol; the PBCH is mapped into the previous time domain symbol and the next time domain symbol of the DMRS symbol or the PBCH is mapped into the next two time domain symbols of the DMRS symbol; the PDCCH is mapped into the time domain symbol adjacent to the DMRS symbol; the PDSCH is mapped into at least one complete time domain symbol; or the PDSCH is mapped into the remaining time-frequency resource, where the remaining time-frequency resource includes the time-frequency resource of the time-frequency resources corresponding to the broadcast signal channel block except the time-frequency resources occupied by the other signals and channels except the PDSCH. The DMRS symbol is the time domain symbol into which the DMRS is mapped.

In some embodiments, the broadcast signal channel block has the characteristics described below.

Each signal included in the broadcast signal channel block is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The intersection between all the RBs or REs of the time domain symbol where the PDCCH is located and the RE into which the DMRS is mapped is empty. The bandwidth occupied by the DMRS carried in each of at least one time domain symbol into which the DMRS is mapped is greater than or equal to the bandwidth occupied by the PDCCH. The bandwidth occupied by the DMRS carried in each of at least one time domain symbol into which the DMRS is mapped is greater than or equal to the bandwidth occupied by the PBCH carried in each time domain symbol into which the PBCH is mapped. The PSS and the SSS are each mapped into one time domain symbol. The PBCH is mapped into two time domain symbols and mapped into the previous time domain symbol and the next time domain symbol of the DMRS symbol. The PDCCH is mapped into one time domain symbol and mapped into the time domain symbol adjacent to the DMRS symbol. The PDSCH is mapped into the remaining time-frequency resource, where the remaining time-frequency resource includes the time-frequency resource of the time-frequency resources corresponding to the broadcast signal channel block except the time-frequency resources occupied by the other signals and channels except the PDSCH. The DMRS is mapped into two time domain symbols. The DMRS symbol is the symbol into which the DMRS is mapped.

In some embodiments, the broadcast signal channel block has the characteristics described below.

Each signal included in the broadcast signal channel block is mapped into at least one RB or at least one RE of the time domain symbol where the each signal is located. Each channel included in the SSB is mapped into at least one RB or at least one RE of the time domain symbol where the each channel is located. The intersection between all the RBs or REs of the time domain symbol where the PBCH is located and the RE into which the DMRS is mapped is empty. The intersection between all the RBs or REs of the time domain symbol where the PDCCH is located and the RE into which the DMRS is mapped is empty. The bandwidth occupied by the DMRS carried in each of at least one time domain symbol into which the DMRS is mapped is greater than or equal to the bandwidth occupied by the PDCCH carried in each time domain symbol into which the PDCCH is mapped. The bandwidth occupied by the DMRS carried in each of at least one time domain symbol into which the DMRS is mapped is greater than or equal to the bandwidth occupied by the PBCH. The PSS, the SSS, and the PBCH are each mapped into one time domain symbol. The PDSCH, the DMRS, and the PDCCH are each mapped into at least one time domain symbol. The PDCCH is mapped into the time domain symbol adjacent to the DMRS symbol. The PBCH is mapped into the time domain symbol adjacent to the DMRS symbol or mapped into the time domain symbol spaced from the DMRS symbol by one time domain symbol. The DMRS symbol is the time domain symbol into which the DMRS is mapped.

Although three possible combinations of characteristics of the broadcast signal channel block are provided above, many other combinations are within the scope of the embodiments of the present disclosure. The details are not repeated here.

In some embodiments, N is 1 and the 7N consecutive time domain symbols are a seventeenth time domain symbol, an eighteenth time domain symbol, a nineteenth time domain symbol, a twentieth time domain symbol, a twenty-first time domain symbol, a twenty-second time domain symbol, and a twenty-third time domain symbol in sequence, and that the signals and the channels included in the broadcast signal channel block are mapped into the 7N consecutive time domain symbols in the time-division multiplexing manner includes any one of the following: the PDCCH is mapped into the seventeenth time domain symbol, the DMRS is mapped into the eighteenth time domain symbol, the PBCH is mapped into the nineteenth time domain symbol and the twentieth time domain symbol, the PSS is mapped into the twenty-first time domain symbol, the SSS is mapped into the twenty-second time domain symbol, and the PDSCH is mapped into the twenty-third time domain symbol; the PDCCH is mapped into the seventeenth time domain symbol, the DMRS is mapped into the eighteenth time domain symbol, the PBCH is mapped into the nineteenth time domain symbol and the twentieth time domain symbol, the PSS is mapped into the twenty-second time domain symbol, the SSS is mapped into the twenty-first time domain symbol, and the PDSCH is mapped into the twenty-third time domain symbol; the PDCCH is mapped into the seventeenth time domain symbol, the DMRS is mapped into the nineteenth time domain symbol, the PBCH is mapped into the eighteenth time domain symbol and the twentieth time domain symbol, the PSS is mapped into the twenty-first time domain symbol, the SSS is mapped into the twenty-second time domain symbol, and the PDSCH is mapped into the twenty-third time domain symbol; the PDCCH is mapped into the seventeenth time domain symbol, the DMRS is mapped into the nineteenth time domain symbol, the PBCH is mapped into the eighteenth time domain symbol and the twentieth time domain symbol, the PSS is mapped into the twenty-second time domain symbol, the SSS is mapped into the twenty-first time domain symbol, and the PDSCH is mapped into the twenty-third time domain symbol; the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-first time domain symbol, the SSS is mapped into the twenty-second time domain symbol, and the PDSCH is mapped into the twenty-third time domain symbol; the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-second time domain symbol, the SSS is mapped into the twenty-first time domain symbol, and the PDSCH is mapped into the twenty-third time domain symbol; the PDCCH is mapped into the seventeenth time domain symbol, the DMRS is mapped into the eighteenth time domain symbol and the twenty-second time domain symbol, the PBCH is mapped into the twenty-first time domain symbol and the twenty-third time domain symbol, the PSS is mapped into the nineteenth time domain symbol, and the SSS is mapped into the twentieth time domain symbol; the PDCCH is mapped into the seventeenth time domain symbol, the DMRS is mapped into the eighteenth time domain symbol and the twenty-second time domain symbol, the PBCH is mapped into the twenty-first time domain symbol and the twenty-third time domain symbol, the PSS is mapped into the twentieth time domain symbol, and the SSS is mapped into the nineteenth time domain symbol; the PDCCH is mapped into the seventeenth time domain symbol, the DMRS is mapped into the eighteenth time domain symbol and the twenty-first time domain symbol, the PBCH is mapped into the twentieth time domain symbol and the twenty-second time domain symbol, the PSS is mapped into the twenty-third time domain symbol, and the SSS is mapped into the nineteenth time domain symbol; the PDCCH is mapped into the seventeenth time domain symbol, the DMRS is mapped into the eighteenth time domain symbol and the twenty-first time domain symbol, the PBCH is mapped into the twentieth time domain symbol and the twenty-second time domain symbol, the PSS is mapped into the nineteenth time domain symbol, and the SSS is mapped into the twenty-third time domain symbol; the PDCCH is mapped into the seventeenth time domain symbol, the DMRS is mapped into the eighteenth time domain symbol and the twentieth time domain symbol, the PBCH is mapped into the nineteenth time domain symbol and the twenty-first time domain symbol, the PSS is mapped into the twenty-third time domain symbol, and the SSS is mapped into the twenty-second time domain symbol; the PDCCH is mapped into the seventeenth time domain symbol, the DMRS is mapped into the eighteenth time domain symbol, the PBCH is mapped into the nineteenth time domain symbol, the PSS is mapped into the twentieth time domain symbol, the SSS is mapped into the twenty-first time domain symbol, and the PDSCH is mapped into the twenty-second time domain symbol and the twenty-third time domain symbol; the PDCCH is mapped into the seventeenth time domain symbol, the DMRS is mapped into the eighteenth time domain symbol and the twenty-first time domain symbol, the PBCH is mapped into the twenty-second time domain symbol, the PSS is mapped into the nineteenth time domain symbol, the SSS is mapped into the twentieth time domain symbol, and the PDSCH is mapped into the twenty-third time domain symbol; the PDCCH is mapped into the seventeenth time domain symbol, the DMRS is mapped into the eighteenth time domain symbol and the twenty-first time domain symbol, the PBCH is mapped into the twentieth time domain symbol, the PSS is mapped into the nineteenth time domain symbol, the SSS is mapped into the twenty-second time domain symbol, and the PDSCH is mapped into the twenty-third time domain symbol; the PDCCH is mapped into the seventeenth time domain symbol, the DMRS is mapped into the eighteenth time domain symbol and the twentieth time domain symbol, the PBCH is mapped into the twenty-first time domain symbol, the PSS is mapped into the nineteenth time domain symbol, the SSS is mapped into the twenty-second time domain symbol, and the PDSCH is mapped into the twenty-third time domain symbol; the PDCCH is mapped into the eighteenth time domain symbol, the DMRS is mapped into the seventeenth time domain symbol and the twenty-first time domain symbol, the PBCH is mapped into the twentieth time domain symbol, the PSS is mapped into the nineteenth time domain symbol, the SSS is mapped into the twenty-second time domain symbol, and the PDSCH is mapped into the twenty-third time domain symbol; the PDCCH is mapped into the eighteenth time domain symbol, the DMRS is mapped into the seventeenth time domain symbol and the twentieth time domain symbol, the PBCH is mapped into the twenty-first time domain symbol, the PSS is mapped into the nineteenth time domain symbol, the SSS is mapped into the twenty-second time domain symbol, and the PDSCH is mapped into the twenty-third time domain symbol; the PDCCH is mapped into the seventeenth time domain symbol, the DMRS is mapped into the eighteenth time domain symbol and the twenty-second time domain symbol, the PBCH is mapped into the twenty-first time domain symbol, the PSS is mapped into the nineteenth time domain symbol, the SSS is mapped into the twentieth time domain symbol, and the PDSCH is mapped into the twenty-third time domain symbol; the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-first time domain symbol, the SSS is mapped into the twenty-second time domain symbol, and the PDSCH is mapped into the twenty-third time domain symbol; or the PDCCH is mapped into the eighteenth time domain symbol, the DMRS is mapped into the seventeenth time domain symbol, the PBCH is mapped into the nineteenth time domain symbol, the PSS is mapped into the twentieth time domain symbol, the SSS is mapped into the twenty-first time domain symbol, and the PDSCH is mapped into the twenty-second time domain symbol and the twenty-third time domain symbol.

There are many other mapping schemes as long as the preceding characteristics of the SSB are satisfied. Mapping schemes that satisfy the preceding characteristics of the SSB are all within the scope of the embodiments of the present disclosure.

In the wireless transmission apparatus in the embodiments of the present disclosure, the PDCCH and the PDSCH are integrated based on the SSB so that the broadcast signal channel block (BSCHB) is formed, which is more conducive to sending an adaptive beam; and the signals and the channels included in the broadcast signal channel block are mapped into the 7N consecutive time domain symbols in the time-division multiplexing manner to be transmitted, implementing the transmission of the broadcast signal channel block in a single-carrier system.

In the related art, the DMRS usually uses a frequency-division multiplexing manner for inserting a DMRS sequence into another channel. When the other channel is demodulated with reference to the DMRS, the demodulation is performed with reference to the DMRS sequence. The DMRS cannot use the frequency-division multiplexing manner in the single-carrier system, so the above manner is inapplicable. When the DMRS does not use the frequency-division multiplexing manner in a multicarrier system, the above manner is also inapplicable.

FIG. 12 is a flowchart of an information determination method according to an embodiment of the present disclosure.

Referring to FIG. 12, the information determination method provided in the embodiment of the present disclosure includes the step below.

In step 1200, a frequency domain reference point of a DMRS is determined according to a reference point and a first frequency offset.

The reference point includes any one of a lowest resource block (RB), a highest RB, a lowest resource element (RE), or a highest RE among frequency domain positions into which a position reference channel is mapped in a time domain symbol where the position reference channel is located.

In some embodiments, the position reference channel includes any one of a physical downlink control channel (PDCCH), a physical broadcast channel (PBCH), a primary synchronization signal (PSS), or a secondary synchronization signal (SSS); a bandwidth occupied by the DMRS is greater than or equal to a bandwidth occupied by a to-be-demodulated channel; and each of the DMRS, the to-be-demodulated channel, and the position reference channel is mapped into at least one RB or at least one RE of a time domain symbol where the each of the DMRS, the to-be-demodulated channel, and the position reference channel is located.

In some embodiments, the first frequency offset is X RBs, Y REs, or X RBs plus Y REs, where both X and Y are integers greater than or equal to 0. In some embodiments, X and Y may be predefined by a protocol or configured via radio resource control (RRC) signaling.

In some embodiment, that the frequency domain reference point of the DMRS is determined according to the reference point and the first frequency offset includes any one of the following:

It is determined that the frequency domain reference point of the DMRS deviates from the reference point by the first frequency offset in a low frequency direction. It is determined that the frequency domain reference point of the DMRS deviates from the reference point by the first frequency offset in a high frequency direction.

In some embodiments, the method further includes the step below.

A reference sequence in the DMRS is determined according to the frequency domain reference point of the DMRS, where the to-be-demodulated channel is demodulated with reference to the reference sequence in the DMRS.

In some embodiments, that the reference sequence in the DMRS is determined according to the frequency domain reference point of the DMRS includes the step below.

With a position whose distance from the frequency domain reference point of the DMRS is a third frequency offset (that is, offset0 in FIG. 13) as a starting point, a sequence having the same frequency domain length as the to-be-demodulated channel is taken from the DMRS as the reference sequence.

In some embodiments, the first frequency offset, a second frequency offset between the lowest RE among the frequency domain positions into which the position reference channel is mapped and a lowest RE among frequency domain positions into which the to-be-demodulated channel is mapped, and the third frequency offset may be directly configured as fixed values via the RRC signaling. Alternatively, candidate values of the first frequency offset, the second frequency offset, and the third frequency offset may be predefined by the protocol, and then values thereof are selected via the RRC signaling. Alternatively, the first frequency offset, the second frequency offset, and the third frequency offset may be predefined as fixed values by the protocol.

In the information determination method in the embodiments of the present disclosure, the frequency domain reference point is determined according to the position reference channel, so as to provide position reference for determining a DMRS demodulation sequence (that is, the preceding reference sequence).

Example 8

In this embodiment, an information determination method is described. In the method, a to-be-demodulated channel is demodulated with reference to a reference sequence in a DMRS.

In time domain, a main characteristic includes that at least three channels such as the DMRS, the to-be-demodulated channel, and a position reference channel are mapped into time domain symbols.

In frequency domain, main characteristics include at least one of the characteristics described below.

A bandwidth occupied by the DMRS is greater than or equal to a bandwidth occupied by the to-be-demodulated channel. With a lowest RE, a lowest RB, a highest RE, or a highest RB of the position reference channel as a reference point, a frequency domain reference point deviates by a fixed offset2 value (that is, a first frequency offset) in a low frequency direction or a high frequency direction. Each of the DMRS, the to-be-demodulated channel, and the position reference channel is mapped into at least one RB or at least one RE of a time domain symbol where the each of the DMRS, the to-be-demodulated channel, and the position reference channel is located.

For example, the method may be applied to the SSB or the broadcast signal channel block provided in the preceding embodiments or may be applied to other structures of signals and channels, which is not limited in embodiments of the present disclosure.

As shown in FIG. 13, the to-be-demodulated channel is a PDCCH, and the position reference channel is a PBCH, which is only an example. The PDCCH is demodulated with reference to the reference sequence in the DMRS. With frequency domain positions of the PBCH known, a method for determining the frequency domain reference point of the DMRS includes at least one of the following:

(a) with the lowest RE of the PBCH as the reference point, the frequency domain reference point deviates by offset2 (that is, X RBs) in the low frequency direction, where X is 0 or a positive integer greater than 0; (b)

with the lowest RE of the PBCH as the reference point, the frequency domain reference point deviates by offset2 (that is, Y REs) in the low frequency direction, where Y is 0 or a positive integer greater than 0; (c) with the lowest RE of the PBCH as the reference point, the frequency domain reference point deviates by offset2 (that is, X RBs plus Y REs) in the low frequency direction, where each of X and Y is 0 or a positive integer greater than 0; (d) with the lowest RB of the PBCH as the reference point, the frequency domain reference point deviates by offset2 (that is, X RBs) in the low frequency direction, where X is 0 or a positive integer greater than 0; (e) With the lowest RB of the PBCH as the reference point, the frequency domain reference point deviates by offset2 (that is, Y REs) in the low frequency direction, where Y is 0 or a positive integer greater than 0; or (f) with the lowest RB of the PBCH as the reference point, the frequency domain reference point deviates by offset2 (that is, X RBs plus Y REs) in the low frequency direction, where each of X and Y is 0 or a positive integer greater than 0.

A method for configuring offset1 and offset2 is one of the following: directly configuring determined offset values via RRC signaling; determining candidate values of offsets via a protocol predefinition and selecting values of the offsets via RRC signaling; directly defining determined offset values via the protocol predefinition.

In methods (a) to (f), the lowest RE or RB of a channel or signal is used as the reference point. Similarly, the highest RE or RB may also be used as the reference point. A deviation direction from the reference point may be the low frequency direction or the high frequency direction. Similar methods are not repeated here.

An embodiment of the present disclosure provides an electronic device. The electronic device includes at least one processor and a storage apparatus.

The storage apparatus is configured to store at least one program; where when executed by the at least one processor, the at least one program causes the at least one processor to perform any one of the preceding information determination methods.

The processor is a device having a data processing capability and includes, but is not limited to, a central processing unit (CPU) and the like. A memory is a device having a data storage capability and includes, but is not limited to, a RAM such as an SDRAM and a DDR SDRAM, a ROM, an EEPROM, and a flash memory.

In some embodiments, the processor and the memory are interconnected via a bus and then connected to other components of a computing device.

An embodiment of the present disclosure provides a computer-readable storage medium, which is configured to store a computer program which, when executed by a processor, implements any one of the preceding information determination methods.

Figure 14:
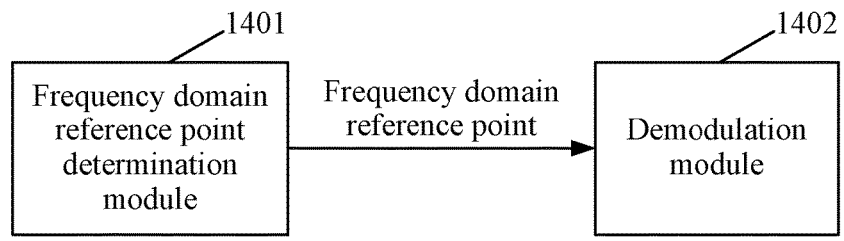
FIG. 14 is a block diagram of an information determination apparatus according to an embodiment of the present disclosure.

FIG. 14 is a block diagram of an information determination apparatus according to an embodiment of the present disclosure.

Referring to FIG. 14, the information determination apparatus provided in the embodiment of the present disclosure includes a frequency domain reference point determination module 1401.

The frequency domain reference point determination module 1401 is configured to determine a frequency domain reference point of a DMRS according to a reference point and a first frequency offset. The reference point includes any one of a lowest resource block (RB), a highest RB, a lowest resource element (RE), or a highest RE among frequency domain positions into which a position reference channel is mapped in a time domain symbol where the position reference channel is located.

In some embodiments, the position reference channel includes any one of a physical downlink control channel (PDCCH), a physical broadcast channel (PBCH), a primary synchronization signal (PSS), or a secondary synchronization signal (SSS); a bandwidth occupied by the DMRS is greater than or equal to a bandwidth occupied by a to-be-demodulated channel; and each of the DMRS, the to-be-demodulated channel, and the position reference channel is mapped into at least one RB or at least one RE of a time domain symbol where the each of the DMRS, the to-be-demodulated channel, and the position reference channel is located.

In some embodiments, the first frequency offset is X RBs, Y REs, or X RBs plus Y REs, where both X and Y are integers greater than or equal to 0. In some embodiments, X and Y may be predefined by a protocol or configured via radio resource control (RRC) signaling.

In some embodiments, the apparatus for determining the frequency domain reference point of the DMRS further includes a demodulation module 1402.

The demodulation module 1402 is configured to determine a reference sequence in the DMRS according to the frequency domain reference point of the DMRS, where the to-be-demodulated channel is demodulated with reference to the reference sequence in the DMRS.

In some embodiments, the demodulation module 1402 is configured to determine the reference sequence in the DMRS according to the frequency domain reference point of the DMRS in the manner below.

With a position whose distance from the frequency domain reference point of the DMRS is a third frequency offset as a starting point, a sequence having the same frequency domain length as the to-be-demodulated channel is taken from the DMRS as the reference sequence.

In some embodiments, the first frequency offset, a second frequency offset, and the third frequency offset may be directly configured as fixed values via the RRC signaling. Alternatively, candidate values of the first frequency offset, the second frequency offset, and the third frequency offset may be predefined by the protocol, and then values thereof are selected via the RRC signaling. Alternatively, the first frequency offset, the second frequency offset, and the third frequency offset may be predefined as fixed values by the protocol.

In some embodiments, the frequency domain reference point determination module 1401 is configured to perform any one of the following:

It is determined that the frequency domain reference point of the DMRS deviates from the reference point by the first frequency offset in a low frequency direction. It is determined that the frequency domain reference point of the DMRS deviates from the reference point by the first frequency offset in a high frequency direction.

Figure 15:
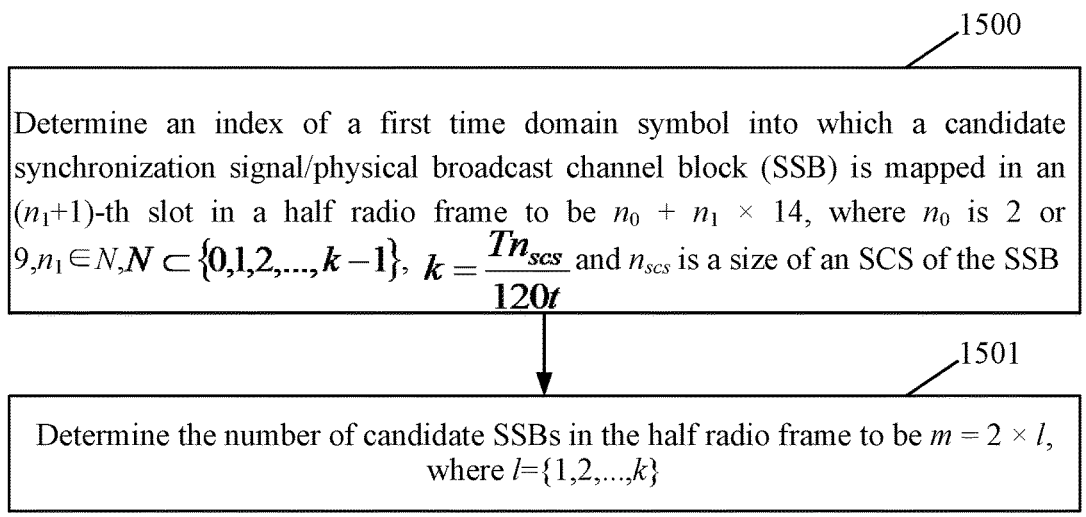
FIG. 15 is a flowchart of another information determination method according to an embodiment of the present disclosure.

FIG. 15 is a flowchart of another information determination method according to an embodiment of the present disclosure.

Referring to FIG. 15, another information determination method provided in the embodiment of the present disclosure includes the steps below.

In step 1500, an index of a first time domain symbol into which a candidate synchronization signal/physical broadcast channel block (SSB) is mapped in an ($n_1$+1)-th slot in a half radio frame is determined to be $n_0+n_1\times 14$, where $n_0$ is 2 or 9, $n_1 \in N$, $N \subset \{0, 1, 2, \ldots, k-1\}$, $$k = \frac{Tn_{scs}}{120t},$$

and $n_{scs}$ is a size of an SCS of the SSB.

In step 1501, the number of candidate SSBs in the half radio frame is determined to be $m=2\times l$, where $l=\{1, 2, \ldots, k\}$.

The method is applicable to the case where signals and channels included in the SSB are mapped into five consecutive time domain symbols in a time-division multiplexing manner to be transmitted.

Example 9

In this example, an information determination method is described.

The implementation of the technical solution is described below in conjunction with a drawing.

In this example, a method for determining time domain positions of an SSB with an SCS of 120 kHz is described, where signals and channels included in the SSB are mapped into five consecutive time domain symbols in a time-division multiplexing manner to be transmitted (for example, the transmission method in the preceding example 2).

Figure 16:
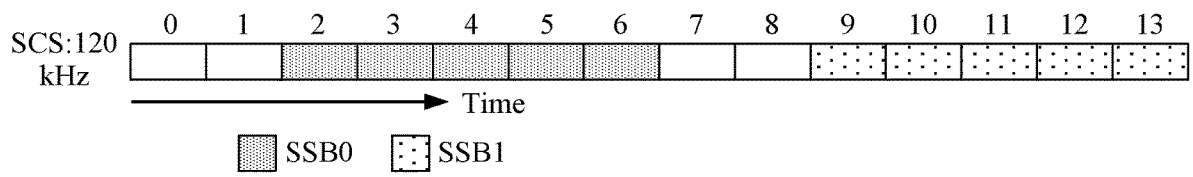
FIG. 16 is a schematic diagram illustrating that SSBs each with five time domain symbols are distributed periodically in example 9.

FIG. 16 shows the time domain positions of SSBs whose subcarrier spacing is 120 kHz within t=0.125 ms, where time granularity in a horizontal direction is a time domain symbol, that is, one pane represents one time domain symbol, and the duration t of the time domain symbols is inversely proportional to the SCS. Uppermost numbers in FIG. 16 represent indexes of time domain symbols corresponding to the subcarrier spacing of 120 kHz within t=0.125 ms.

Referring to FIG. 16, an index of a first time domain symbol into which a candidate SSB is mapped in an $(n_1+1)$-th slot in a half radio frame (T=5 ms) is $n_0+n_1\times 14$, where $n_0$ is 2 or 9, $n_1 \in N$, $N \subset \{0, 1, 2, \ldots, k-1\}$, $$k = \frac{Tn_{scs}}{120t},$$

and $n_{scs}$ is a size of the SCS of the SSB. In this example, $n_{scs}=120$.

Candidate SSBs in the half radio frame are sequentially numbered in ascending order of time, and the number of the candidate SSBs is $m=2\times l$, where $l=\{1, 2, \ldots, k\}$. The numbers of the candidate SSBs are $0, 1, \ldots, m-1$ in sequence.

Additionally, the method can not only support the SSBs whose SCS is 120 kHz but also support SSBs whose SCS is 30 kHz, 60 kHz, 240 kHz, 480 kHz, 960 kHz, and the like.

An embodiment of the present disclosure provides an electronic device. The electronic device includes at least one processor and a storage apparatus.

The storage apparatus is configured to store at least one program; where when executed by the at least one processor, the at least one program causes the at least one processor to perform any one of the preceding information determination methods.

The processor is a device having a data processing capability and includes, but is not limited to, a central processing unit (CPU) and the like. A memory is a device having a data storage capability and includes, but is not limited to, a RAM such as an SDRAM and a DDR SDRAM, a ROM, an EEPROM, and a flash memory.

In some embodiments, the processor and the memory are interconnected via a bus and then connected to other components of a computing device.

An embodiment of the present disclosure provides a computer-readable storage medium, which is configured to store a computer program which, when executed by a processor, implements any one of the preceding information determination methods.

Figure 17:
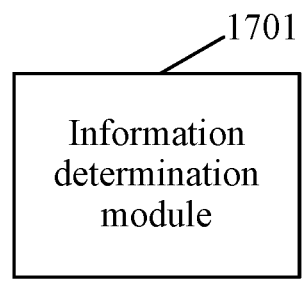
FIG. 17 is a block diagram of another information determination apparatus according to an embodiment of the present disclosure.

FIG. 17 is a block diagram of another information determination apparatus according to an embodiment of the present disclosure.

Referring to FIG. 17, the information determination apparatus provided in the embodiment of the present disclosure includes an information determination module 1701.

The information determination module 1701 is configured to determine an index of a first time domain symbol into which a candidate synchronization signal/physical broadcast channel block (SSB) is mapped in an $(n_1+1)$-th slot in a half radio frame to be $n_0+n_1\times 14$ and determine the number of candidate SSBs in the half radio frame to be $m=2\times l$; where $n_0$ is 2 or 9, $n_1 \in N$, $N \subset \{0, 1, 2, \ldots, k-1\}$, $$k = \frac{Tn_{scs}}{120t},$$

$n_{scs}$ is a size of an SCS of the SSB, and $l=\{1, 2, \ldots, k\}$.

The method is applicable to the case where signals and channels included in the SSB are mapped into five consecutive time domain symbols in a time-division multiplexing manner to be transmitted.

Some or all steps of the preceding method and function modules/units in the preceding system or apparatus may be implemented as software, firmware, hardware and suitable combinations thereof. In the hardware implementation, the division of the preceding function modules/units may not correspond to the division of physical components. For example, one physical component may have multiple functions, or one function or step may be performed jointly by several physical components. Some or all physical components may be implemented as software executed by a processor such as a central processing unit, a digital signal processor or a microprocessor, may be implemented as hardware, or may be implemented as integrated circuits such as application-specific integrated circuits. Such software may be distributed over computer-readable media. The computer-readable media may include computer storage media (or non-transitory media) and communication media (or transitory media). The term computer storage medium includes volatile and nonvolatile media and removable and non-removable media implemented in any method or technology for storing information (such as computer-readable instructions, data structures, program modules or other data). The computer storage media include, but are not limited to, a RAM, a ROM, an EEPROM, a flash memory or other memory technologies, a compact disc ROM (CD-ROM), a digital versatile disc (DVD) or other optical storages, a magnetic cassette, a magnetic tape, a magnetic disk or other magnetic storage devices, or any other medium that can be used for storing desired information and that can be accessed by a computer. Additionally, the communication media generally include computer-readable instructions, data structures, program modules, or other data in carriers or in modulated data signals transported in other transport mechanisms and may include any information delivery medium.

What is claimed is:

1. A wireless transmission method, comprising:
transmitting a synchronization signal/physical broadcast channel block (SSB);
wherein signals and channels comprised in the SSB are mapped into M consecutive time domain symbols in a time-division multiplexing manner, and M is a positive integer; and
wherein the SSB comprises a physical broadcast channel (PBCH), a primary synchronization signal (PSS), a demodulation reference signal (DMRS), and a secondary synchronization signal (SSS);
wherein a frequency domain reference point of the DMRS in the SSB is determined according to a reference point and a first frequency offset,
wherein the reference point comprises any one of a lowest resource block (RB), a highest RB, a lowest resource element (RE), or a highest RE among frequency domain positions into which a position reference channel is mapped in a time domain symbol where the position reference channel is located;
wherein the position reference channel includes any one of a physical downlink control channel, PDCCH, the PBCH, the PSS, or the SSS;
wherein the SSB has the following characteristics:
each signal comprised in the SSB is mapped into at least one resource element (RE) of a time domain symbol where the each signal is located; and each channel comprised in the SSB is mapped into at least one RE of a time domain symbol where the each channel is located;
an intersection between all REs of a time domain symbol where the PBCH is located and an RE into which the DMRS is mapped is empty;
a bandwidth occupied by the DMRS is not less than a bandwidth occupied by the PBCH;
the PSS, the SSS, the PBCH, and the DMRS are each mapped into one time domain symbol respectively; and
a PBCH symbol is adjacent to a DMRS symbol;
the DMRS symbol is a time domain symbol into which the DMRS is mapped, and the PBCH symbol is a time domain symbol into which the PBCH is mapped;
or
wherein the SSB has the following characteristics:
each signal comprised in the SSB is mapped into at least one RE of a time domain symbol where the each signal is located; and each channel comprised in the SSB is mapped into at least one RE of a time domain symbol where the each channel is located;
an intersection between all REs of a time domain symbol where the PBCH is located and an RE into which the DMRS is mapped is empty;
a bandwidth occupied by the DMRS is not less than a bandwidth occupied by the PBCH carried in each time domain symbol into which the PBCH is mapped;
the PSS, the SSS, and the DMRS are each mapped into one time domain symbol respectively;
the PBCH is mapped into two time domain symbols; and
the PBCH is mapped into a previous time domain symbol of a DMRS symbol and a next time domain symbol of the DMRS symbol, wherein the DMRS symbol is a time domain symbol into which the DMRS is mapped.

2. The method of claim 1, wherein M is 5, and the M consecutive time domain symbols are a first time domain symbol, a second time domain symbol, a third time domain symbol, a fourth time domain symbol, and a fifth time domain symbol in sequence; and
wherein that the signals and the channels comprised in the SSB are mapped into the M consecutive time domain symbols in the time-division multiplexing manner comprises one of the following:
the PSS is mapped into the first time domain symbol, the SSS is mapped into the second time domain symbol, the DMRS is mapped into the fourth time domain symbol, and the PBCH is mapped into the third time domain symbol and the fifth time domain symbol;
the PSS is mapped into the second time domain symbol, the SSS is mapped into the first time domain symbol, the DMRS is mapped into the fourth time domain symbol, and the PBCH is mapped into the third time domain symbol and the fifth time domain symbol;
the PSS is mapped into the fifth time domain symbol, the SSS is mapped into the first time domain symbol, the DMRS is mapped into the third time domain symbol, and the PBCH is mapped into the second time domain symbol and the fourth time domain symbol;
the PSS is mapped into the first time domain symbol, the SSS is mapped into the fifth time domain symbol, the DMRS is mapped into the third time domain symbol, and the PBCH is mapped into the second time domain symbol and the fourth time domain symbol;
the PSS is mapped into the fourth time domain symbol, the SSS is mapped into the fifth time domain symbol, the DMRS is mapped into the second time domain symbol, and the PBCH is mapped into the first time domain symbol and the third time domain symbol; or
the PSS is mapped into the fifth time domain symbol, the SSS is mapped into the fourth time domain symbol, the DMRS is mapped into the second time domain symbol, and the PBCH is mapped into the first time domain symbol and the third time domain symbol.

3. The method of claim 1, wherein M is 4, and the M consecutive time domain symbols are a sixth time domain symbol, a seventh time domain symbol, an eighth time domain symbol, and a ninth time domain symbol in sequence; and
wherein that the signals and the channels comprised in the SSB are mapped into the M consecutive time domain symbols in the time-division multiplexing manner comprises one of the following:
the PSS is mapped into the sixth time domain symbol, the SSS is mapped into the seventh time domain symbol, the DMRS is mapped into the eighth time domain symbol, and the PBCH is mapped into the ninth time domain symbol;
the PSS is mapped into the sixth time domain symbol, the SSS is mapped into the seventh time domain symbol, the DMRS is mapped into the ninth time domain symbol, and the PBCH is mapped into the eighth time domain symbol;
the PSS is mapped into the seventh time domain symbol, the SSS is mapped into the sixth time domain symbol, the DMRS is mapped into the eighth time domain symbol, and the PBCH is mapped into the ninth time domain symbol;
the PSS is mapped into the seventh time domain symbol, the SSS is mapped into the sixth time domain symbol, the DMRS is mapped into the ninth time domain symbol, and the PBCH is mapped into the eighth time domain symbol;

the PSS is mapped into the sixth time domain symbol, the SSS is mapped into the ninth time domain symbol, the DMRS is mapped into the eighth time domain symbol, and the PBCH is mapped into the seventh time domain symbol;

the PSS is mapped into the ninth time domain symbol, the SSS is mapped into the sixth time domain symbol, the DMRS is mapped into the eighth time domain symbol, and the PBCH is mapped into the seventh time domain symbol;

the PSS is mapped into the ninth time domain symbol, the SSS is mapped into the sixth time domain symbol, the DMRS is mapped into the seventh time domain symbol, and the PBCH is mapped into the eighth time domain symbol;

the PSS is mapped into the sixth time domain symbol, the SSS is mapped into the ninth time domain symbol, the DMRS is mapped into the seventh time domain symbol, and the PBCH is mapped into the eighth time domain symbol;

the PSS is mapped into the ninth time domain symbol, the SSS is mapped into the eighth time domain symbol, the DMRS is mapped into the sixth time domain symbol, and the PBCH is mapped into the seventh time domain symbol;

the PSS is mapped into the eighth time domain symbol, the SSS is mapped into the ninth time domain symbol, the DMRS is mapped into the sixth time domain symbol, and the PBCH is mapped into the seventh time domain symbol;

the PSS is mapped into the eighth time domain symbol, the SSS is mapped into the ninth time domain symbol, the DMRS is mapped into the seventh time domain symbol, and the PBCH is mapped into the sixth time domain symbol; or the PSS is mapped into the ninth time domain symbol, the SSS is mapped into the eighth time domain symbol, the DMRS is mapped into the seventh time domain symbol, and the PBCH is mapped into the sixth time domain symbol.

4. The method of claim 1, wherein the SSB has the following characteristics:

each signal comprised in the SSB is mapped into at least one RE of a time domain symbol where the each signal is located; and each channel comprised in the SSB is mapped into at least one RE of a time domain symbol where the each channel is located;

a bandwidth occupied by the SSS is greater than or equal to a bandwidth occupied by the PBCH carried in each time domain symbol into which the PBCH is mapped;

the SSS is cross-mapped into REs of a time domain symbol where the SSS is located, wherein being cross-mapped refers to being mapped into only odd-numbered REs of the time domain symbol where the SSS is located or being mapped into only even-numbered REs of the time domain symbol where the SSS is located;

the PSS and the SSS are each mapped into one time domain symbol respectively;

the PBCH is mapped into at least one time domain symbol; and at least one PBCH symbol is adjacent to an SSS symbol, wherein the PBCH symbol is a time domain symbol into which the PBCH is mapped, and the SSS symbol is a time domain symbol into which the SSS is mapped.

5. The method of claim 1, wherein M is 4, and the M consecutive time domain symbols are a tenth time domain symbol, an eleventh time domain symbol, a twelfth time domain symbol, and a thirteenth time domain symbol in sequence; and wherein that the signals and the channels comprised in the SSB are mapped into the M consecutive time domain symbols in the time-division multiplexing manner comprises one of the following:

the PSS is mapped into the tenth time domain symbol, the SSS is mapped into the twelfth time domain symbol, and the PBCH is mapped into the eleventh time domain symbol and the thirteenth time domain symbol;

the PSS is mapped into the thirteenth time domain symbol, the SSS is mapped into the eleventh time domain symbol, and the PBCH is mapped into the tenth time domain symbol and the twelfth time domain symbol; or the PSS is mapped into the thirteenth time domain symbol, the SSS is mapped into the twelfth time domain symbol, and the PBCH is mapped into the tenth time domain symbol and the eleventh time domain symbol.

6. The method of claim 1, wherein M is 3, and the M consecutive time domain symbols are a fourteenth time domain symbol, a fifteenth time domain symbol, and a sixteenth time domain symbol in sequence; and wherein that the signals and the channels comprised in the SSB are mapped into the M consecutive time domain symbols in the time-division multiplexing manner comprises one of the following:

the PSS is mapped into the fourteenth time domain symbol, the SSS is mapped into the sixteenth time domain symbol, and the PBCH is mapped into the fifteenth time domain symbol; or the PSS is mapped into the fourteenth time domain symbol, the SSS is mapped into the fifteenth time domain symbol, and the PBCH is mapped into the sixteenth time domain symbol.

7. A wireless transmission method, comprising:

transmitting a broadcast signal channel block;

wherein signals and channels comprised in the broadcast signal channel block are mapped into 7N consecutive time domain symbols in a time-division multiplexing manner, and N is an integer that is not less than 1; and wherein the broadcast signal channel block comprises a physical downlink control channel (PDCCH), a demodulation reference signal (DMRS), a physical broadcast channel (PBCH), a primary synchronization signal (PSS), and a secondary synchronization signal (SSS);

wherein a frequency domain reference point of the DMRS in the SSB is determined according to a reference point and a first frequency offset, wherein the reference point comprises any one of a lowest resource block (RB), a highest RB, a lowest resource element (RE), or a highest RE among frequency domain positions into which a position reference channel is mapped in a time domain symbol where the position reference channel is located;

wherein the position reference channel includes any one of a physical downlink control channel, PDCCH, the PBCH, the PSS, or the SSS; and wherein the broadcast signal channel block further comprises a physical downlink shared channel (PDSCH);

wherein the broadcast signal channel block has the following characteristics:

each signal comprised in the broadcast signal channel block is mapped into at least one resource element (RE)

of a time domain symbol where the each signal is located; and each channel comprised in the SSB is mapped into at least one RE of a time domain symbol where the each channel is located;

an intersection between all REs of a time domain symbol where the PBCH is located and an RE into which the DMRS is mapped is empty;

an intersection between all REs of a time domain symbol where the PDCCH is located and the RE into which the DMRS is mapped is empty;

a bandwidth occupied by the DMRS is not less than a bandwidth occupied by the PBCH carried in each time domain symbol into which the PBCH is mapped;

the bandwidth occupied by the DMRS is not less than a bandwidth occupied by the PDCCH carried in each time domain symbol into which the PDCCH is mapped;

the DMRS, the PSS, and the SSS are each mapped into one time domain symbol respectively;

the PBCH is mapped into two time domain symbols;

the PDCCH is mapped into at least one time domain symbol;

the PBCH is mapped into a previous time domain symbol of a DMRS symbol and a next time domain symbol of the DMRS symbol, or the PBCH is mapped into next two time domain symbols of the DMRS symbol;

the PDCCH is mapped into a time domain symbol adjacent to the DMRS symbol; and the PDSCH is mapped into at least one time domain symbol;

the DMRS symbol is a time domain symbol into which the DMRS is mapped;

or wherein the broadcast signal channel block has the following characteristics:

each signal comprised in the broadcast signal channel block is mapped into at least one RE of a time domain symbol where the each signal is located; and each channel comprised in the SSB is mapped into at least one RE of a time domain symbol where the each channel is located;

an intersection between all REs of a time domain symbol where the PBCH is located and an RE into which the DMRS is mapped is empty:

an intersection between all REs of a time domain symbol where the PDCCH is located and the RE into which the DMRS is mapped is empty;

a bandwidth occupied by the DMRS carried in at least one time domain symbol into which the DMRS is mapped is not less than a bandwidth occupied by the PDCCH;

a bandwidth occupied by the DMRS carried in at least one time domain symbol into which the DMRS is mapped is not less than a bandwidth occupied by the PBCH carried in each time domain symbol into which the PBCH is mapped;

the PSS and the SSS are each mapped into one time domain symbol respectively;

the PBCH is mapped into two time domain symbols and mapped into a previous time domain symbol of a DMRS symbol and a next time domain symbol of the DMRS symbol;

the PDCCH is mapped into one time domain symbol and mapped into a time domain symbol adjacent to the DMRS symbol; and the DMRS is mapped into two time domain symbols;

the DMRS symbol is a time domain symbol into which the DMRS is mapped;

or wherein the broadcast signal channel block has the following characteristics:

each signal comprised in the broadcast signal channel block is mapped into at least one RE of a time domain symbol where the each signal is located; and each channel comprised in the SSB is mapped into at least one RE of a time domain symbol where the each channel is located;

an intersection between all REs of a time domain symbol where the PBCH is located and an RE into which the DMRS is mapped is empty:

an intersection between all REs of a time domain symbol where the PDCCH is located and the RE into which the DMRS is mapped is empty:

a bandwidth occupied by the DMRS carried in at least one time domain symbol into which the DMRS is mapped is not less than a bandwidth occupied by the PDCCH carried in each time domain symbol into which the PDCCH is mapped;

a bandwidth occupied by the DMRS carried in at least one time domain symbol into which the DMRS is mapped is not less than a bandwidth occupied by the PBCH;

the PSS, the SSS, and the PBCH are each mapped into one time domain symbol respectively;

the PDSCH, the DMRS, and the PDCCH are each mapped into at least one time domain symbol;

the PDCCH is mapped into a time domain symbol adjacent to a DMRS symbol; and the PBCH is mapped into a time domain symbol adjacent to the DMRS symbol or mapped into a time domain symbol spaced from the DMRS symbol by one time domain symbol;

the DMRS symbol is a time domain symbol into which the DMRS is mapped.

8. The method of claim 7, wherein N is 1, the 7N consecutive time domain symbols are a seventeenth time domain symbol, an eighteenth time domain symbol, a nineteenth time domain symbol, a twentieth time domain symbol, a twenty-first time domain symbol, a twenty-second time domain symbol, and a twenty-third time domain symbol in sequence, and that the signals and the channels comprised in the broadcast signal channel block are mapped into the 7N consecutive time domain symbols in the time-division multiplexing manner comprises one of the following:

the PDCCH is mapped into the seventeenth time domain symbol, the DMRS is mapped into the eighteenth time domain symbol, the PBCH is mapped into the nineteenth time domain symbol and the twentieth time domain symbol, the PSS is mapped into the twenty-first time domain symbol, the SSS is mapped into the twenty-second time domain symbol, and the PDSCH is mapped into the twenty-third time domain symbol;

the PDCCH is mapped into the seventeenth time domain symbol, the DMRS is mapped into the eighteenth time domain symbol, the PBCH is mapped into the nineteenth time domain symbol and the twentieth time domain symbol, the PSS is mapped into the twenty-second time domain symbol, the SSS is mapped into the twenty-first time domain symbol, and the PDSCH is mapped into the twenty-third time domain symbol;

the PDCCH is mapped into the seventeenth time domain symbol, the DMRS is mapped into the nineteenth time domain symbol, the PBCH is mapped into the eighteenth time domain symbol and the twentieth time domain symbol, the PSS is mapped into the twenty-first time domain symbol, the SSS is mapped into the twenty-second time domain symbol, and the PDSCH is mapped into the twenty-third time domain symbol;

the PDCCH is mapped into the seventeenth time domain symbol, the DMRS is mapped into the nineteenth time domain symbol, the PBCH is mapped into the eighteenth time domain symbol and the twentieth time domain symbol, the PSS is mapped into the twenty-second time domain symbol, the SSS is mapped into the twenty-first time domain symbol, and the PDSCH is mapped into the twenty-third time domain symbol;

the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-first time domain symbol, the SSS is mapped into the twenty-second time domain symbol, and the PDSCH is mapped into the twenty-third time domain symbol;

the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-second time domain symbol, the SSS is mapped into the twenty-first time domain symbol, and the PDSCH is mapped into the twenty-third time domain symbol;

the PDCCH is mapped into the seventeenth time domain symbol, the DMRS is mapped into the eighteenth time domain symbol and the twenty-second time domain symbol, the PBCH is mapped into the twenty-first time domain symbol and the twenty-third time domain symbol, the PSS is mapped into the nineteenth time domain symbol, and the SSS is mapped into the twentieth time domain symbol;

the PDCCH is mapped into the seventeenth time domain symbol, the DMRS is mapped into the eighteenth time domain symbol and the twenty-second time domain symbol, the PBCH is mapped into the twenty-first time domain symbol and the twenty-third time domain symbol, the PSS is mapped into the twentieth time domain symbol, and the SSS is mapped into the nineteenth time domain symbol;

the PDCCH is mapped into the seventeenth time domain symbol, the DMRS is mapped into the eighteenth time domain symbol and the twenty-first time domain symbol, the PBCH is mapped into the twentieth time domain symbol and the twenty-second time domain symbol, the PSS is mapped into the twenty-third time domain symbol, and the SSS is mapped into the nineteenth time domain symbol;

the PDCCH is mapped into the seventeenth time domain symbol, the DMRS is mapped into the eighteenth time domain symbol, the PBCH is mapped into the nineteenth time domain symbol and the twenty-first time domain symbol and the twenty-first time domain symbol, the PSS is mapped into the twenty-second time domain symbol, and the SSS is mapped into the twenty-third time domain symbol;

the PDCCH is mapped into the seventeenth time domain symbol, the DMRS is mapped into the eighteenth time domain symbol and the twentieth time domain symbol, the PBCH is mapped into the nineteenth time domain symbol and the twenty-first time domain symbol, the PSS is mapped into the twenty-third time domain symbol, and the SSS is mapped into the twenty-second time domain symbol;

the PDCCH is mapped into the seventeenth time domain symbol, the DMRS is mapped into the eighteenth time domain symbol, the PBCH is mapped into the nineteenth time domain symbol, the PSS is mapped into the twentieth time domain symbol, the SSS is mapped into the twenty-first time domain symbol, and the PDSCH is mapped into the twenty-second time domain symbol and the twenty-third time domain symbol;

the PDCCH is mapped into the seventeenth time domain symbol, the DMRS is mapped into the eighteenth time domain symbol and the twenty-first time domain symbol, the PBCH is mapped into the twenty-second time domain symbol, the PSS is mapped into the nineteenth time domain symbol, the SSS is mapped into the twentieth time domain symbol, and the PDSCH is mapped into the twenty-third time domain symbol;

the PDCCH is mapped into the seventeenth time domain symbol, the DMRS is mapped into the eighteenth time domain symbol and the twenty-first time domain symbol, the PBCH is mapped into the twentieth time domain symbol, the PSS is mapped into the nineteenth time domain symbol, the SSS is mapped into the twenty-second time domain symbol, and the PDSCH is mapped into the twenty-third time domain symbol;

the PDCCH is mapped into the seventeenth time domain symbol, the DMRS is mapped into the eighteenth time domain symbol and the twentieth time domain symbol, the PBCH is mapped into the twenty-first time domain symbol, the PSS is mapped into the nineteenth time domain symbol, the SSS is mapped into the twenty-second time domain symbol, and the PDSCH is mapped into the twenty-third time domain symbol;

the PDCCH is mapped into the eighteenth time domain symbol, the DMRS is mapped into the seventeenth time domain symbol and the twenty-first time domain symbol, the PBCH is mapped into the twentieth time domain symbol, the PSS is mapped into the nineteenth time domain symbol, the SSS is mapped into the twenty-second time domain symbol, and the PDSCH is mapped into the twenty-third time domain symbol;

the PDCCH is mapped into the eighteenth time domain symbol, the DMRS is mapped into the seventeenth time domain symbol and the twentieth time domain symbol, the PBCH is mapped into the twenty-first time domain symbol, the PSS is mapped into the nineteenth time domain symbol, the SSS is mapped into the twenty-second time domain symbol, and the PDSCH is mapped into the twenty-third time domain symbol;

the PDCCH is mapped into the seventeenth time domain symbol, the DMRS is mapped into the eighteenth time domain symbol and the twenty-second time domain symbol, the PBCH is mapped into the twenty-first time domain symbol, the PSS is mapped into the nineteenth time domain symbol, the SSS is mapped into the twentieth time domain symbol, and the PDSCH is mapped into the twenty-third time domain symbol;

the PDCCH is mapped into the seventeenth time domain symbol and the eighteenth time domain symbol, the DMRS is mapped into the nineteenth time domain symbol, the PBCH is mapped into the twentieth time domain symbol, the PSS is mapped into the twenty-first time domain symbol, the SSS is mapped into the twenty-second time domain symbol, and the PDSCH is mapped into the twenty-third time domain symbol; or the PDCCH is mapped into the eighteenth time domain symbol, the DMRS is mapped into the seventeenth time domain symbol, the PBCH is mapped into the nineteenth time domain symbol, the PSS is mapped into the twentieth time domain symbol, the SSS is mapped into the twenty-first time domain symbol, and the PDSCH is mapped into the twenty-second time domain symbol and the twenty-third time domain symbol.

* * * * *